United States Patent
Park et al.

(10) Patent No.: US 12,294,140 B2
(45) Date of Patent: May 6, 2025

(54) ELECTRONIC DEVICE COMPRISING ANTENNA

(71) Applicant: Samsung Electronics Co., Ltd., Suwon-si (KR)

(72) Inventors: Jeongwan Park, Suwon-si (KR); Gyubok Park, Suwon-si (KR); Min Sakong, Suwon-si (KR); Moonsoo Son, Suwon-si (KR); Kwanseok Lee, Suwon-si (KR); Injin Hwang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 188 days.

(21) Appl. No.: 18/141,146

(22) Filed: Apr. 28, 2023

(65) Prior Publication Data
US 2023/0268639 A1    Aug. 24, 2023

Related U.S. Application Data

(63) Continuation of application No. PCT/KR2022/012916, filed on Aug. 30, 2022.

(30) Foreign Application Priority Data

Sep. 6, 2021    (KR) .................. 10-2021-0118384

(51) Int. Cl.
*H01Q 1/24* (2006.01)
*H01Q 1/48* (2006.01)
*H01Q 5/30* (2015.01)

(52) U.S. Cl.
CPC .............. *H01Q 1/243* (2013.01); *H01Q 1/48* (2013.01); *H01Q 5/30* (2015.01)

(58) Field of Classification Search
CPC .............. H01Q 1/243; H01Q 5/30; H01Q 1/48
See application file for complete search history.

(56) References Cited

U.S. PATENT DOCUMENTS

| | | | |
|---|---|---|---|
| 10,608,324 B2 | 3/2020 | Lee et al. | |
| 10,931,034 B2 | 2/2021 | Zhu et al. | |

(Continued)

FOREIGN PATENT DOCUMENTS

| | | | |
|---|---|---|---|
| CN | 109103576 A | 12/2018 | |
| CN | 111987433 A | 11/2020 | |

(Continued)

OTHER PUBLICATIONS

International Search Report and Written Opinion for International Application No. PCT/KR2022/012916; International Filing Date Aug. 30, 2022; Date of Mailing Dec. 19, 2022; 64 pages.

(Continued)

*Primary Examiner* — Graham P Smith
(74) *Attorney, Agent, or Firm* — CANTOR COLBURN LLP

(57) ABSTRACT

An electronic device according to an embodiment may include an antenna radiator, a conductive member, a wireless communication circuit configured to feed power to a first point of the conductive member and a second point spaced apart from the first point, and a ground electrically connected to a third point between the first point and the second point of the conductive member, at least a portion of one region of the conductive member including the third point may overlap the antenna radiator, and the wireless communication circuit may be configured to transmit and/or receive a signal of a first frequency band based on a first electrical path formed by feeding power to the first point of the conductive member; and transmit and/or receive the signal of the first frequency band based on a second electrical path (Continued)

formed by feeding power to the second point of the conductive member.

20 Claims, 24 Drawing Sheets

(56) References Cited

U.S. PATENT DOCUMENTS

| | | |
|---|---|---|
| 2008/0258993 A1 | 10/2008 | Gummalla et al. |
| 2013/0099980 A1 | 4/2013 | Hayashi |
| 2013/0234911 A1 | 9/2013 | Lee |
| 2013/0257674 A1 | 10/2013 | Li et al. |
| 2017/0077599 A1 | 3/2017 | Sayama et al. |
| 2017/0187113 A1 | 6/2017 | Svendsen et al. |
| 2019/0006734 A1 | 1/2019 | Svendsen et al. |
| 2020/0212568 A1 | 7/2020 | Wu |
| 2021/0111486 A1 | 4/2021 | Tamrakar et al. |

FOREIGN PATENT DOCUMENTS

| | | |
|---|---|---|
| CN | 112310622 A | 2/2021 |
| EP | 2735488 B1 | 5/2014 |
| KR | 20100127372 A | 12/2010 |
| KR | 20120113832 A | 10/2012 |
| KR | 20130102170 A | 9/2013 |
| KR | 20180035605 A | 4/2018 |
| WO | 2016112628 A1 | 7/2016 |

OTHER PUBLICATIONS

Extended European Search Report Issued In EP Application No. 22864995.0-1201, Mail Date Sep. 9, 2024, 13 Pages.

<Equivalent Circuit Diagram>

ELECTRONIC DEVICE COMPRISING ANTENNA

CROSS-REFERENCE TO RELATED APPLICATION(S)

This application is a continuation application, claiming priority under § 365 (c), of an International application No. PCT/KR2022/012916, filed on Aug. 30, 2022, which is based on and claims the benefit of a Korean patent application number 10-2021-0118384, filed on Sep. 6, 2021, in the Korean Intellectual Property Office, the disclosure of which is incorporated by reference herein in its entirety.

BACKGROUND

Field

Various embodiments disclosed herein relate to an electronic device including an antenna.

Description of Related Art

Electronic devices (e.g., a mobile terminal, a smartphone, or a wearable device) may serve various functions. For example, in addition to a basic voice communication function, a smartphone may serve various additional functions such as short-range wireless communication (e.g., Bluetooth, Wi-Fi, or near field communication (NFC)) function, mobile communication (3rd generation (3G), 4G, 5G, or the like) functions, music or video playback functions, imaging functions, or navigation functions.

Recent electronic devices include a plurality of antennas to improve data processing speed and reliability. For example, the electronic devices may include a multi-input multi-output (MIMO) antenna or a diversity antenna.

SUMMARY

Interference may occur between a plurality of antennas disposed inside an electronic device. To prevent interference between a plurality of antennas, it is often necessary to secure a sufficient separation distance between each of the antennas in the plurality of antennas in the electronic device. However, since electronic devices typically have limited internal space, it may be difficult to secure the separation distance between the antennas.

Interference between the antennas of the plurality of antennas may also occur even when a coupler structure is used. For example, when a first antenna and a second antenna use a coupler structure (e.g., a metal plate) having a larger volume than the first antenna and the second antenna, interference may occur between electrical paths formed when a wireless communication circuit feeds power to each of a first feeding point of the first antenna and a second feeding point of the second antenna.

According to various embodiments disclosed herein, a ground that is electrically connected to a third point between the first feeding point and the second feeding point of the conductive member may be electromagnetically connected to the metal plate in a coupling manner.

An electronic device according to an embodiment may include an antenna radiator, a conductive member spaced apart from the antenna radiator in a first direction perpendicular to one surface of the antenna radiator and electrically connected to the antenna radiator via a coupling, a wireless communication circuit configured to feed power to a first point of the conductive member and a second point spaced apart from the first point; and a ground electrically connected to a third point between the first point and the second point of the conductive member, wherein at least a portion of a coupling region of the conductive member that includes the third point may overlap the antenna radiator when viewed in the first direction, and the wireless communication circuit may be configured to transmit and/or receive a signal of a first frequency band based on a first electrical path formed in a first portion of the conductive member including the first point and a first region of the antenna radiator corresponding to the first portion by feeding power to the first point of the conductive member; and transmit and/or receive a signal of the first frequency band or a second frequency band based on a second electrical path formed in a second portion of the conductive member including the second point and a second region of the antenna radiator corresponding to the second portion by feeding power to the second point of the conductive member.

An electronic device according to an embodiment may include a metal plate configured to act as an antenna radiator, a conductive member spaced apart from the metal plate by a specific distance in a first direction perpendicular to one surface of the metal plate and electrically connected to the metal plate via a coupling, a wireless communication circuit configured to feed power to a first point of the conductive member and a second point spaced apart from the first point, and a ground electrically connected to a third point between the first point and the second point of the conductive member, and at least a portion of a coupling region of the conductive member that includes the third point may overlap the metal plate when viewed in the first direction, and wherein the wireless communication circuit may be configured to transmit and/or receive a signal of a first frequency band based on a first electrical path formed in a first portion of the conductive member including the first point and a first region of the metal plate corresponding to the first portion by feeding power to the first point of the conductive member and transmit and/or receive a signal of the first frequency band or a second frequency band based on a second electrical path formed in a second portion of the conductive member including the second point and a second region of the metal plate corresponding to the second portion by feeding power to the second point of the conductive member. According to various embodiments disclosed herein, it is possible to improve the antenna efficiency of an electronic device via a coupler structure (e.g., a metal plate) having a relatively larger volume than a conductive member fed with power by the wireless communication circuit, and to improve the isolation of antennas through connection with a ground.

In addition, various effects directly or indirectly identified through the disclosure may be provided.

BRIEF DESCRIPTION OF THE DRAWINGS

In connection with the description of the drawings, the same or similar components may be denoted by the same or similar reference numerals.

DETAILED DESCRIPTION

Hereinafter, various embodiments of the disclosure will be described with reference to the accompanying drawings. However, it shall be understood that it is not intended to limit the disclosure to specific embodiments, and that the disclosure includes various modifications, equivalents, and/or alternatives of the embodiments of the disclosure.

Figure 1:
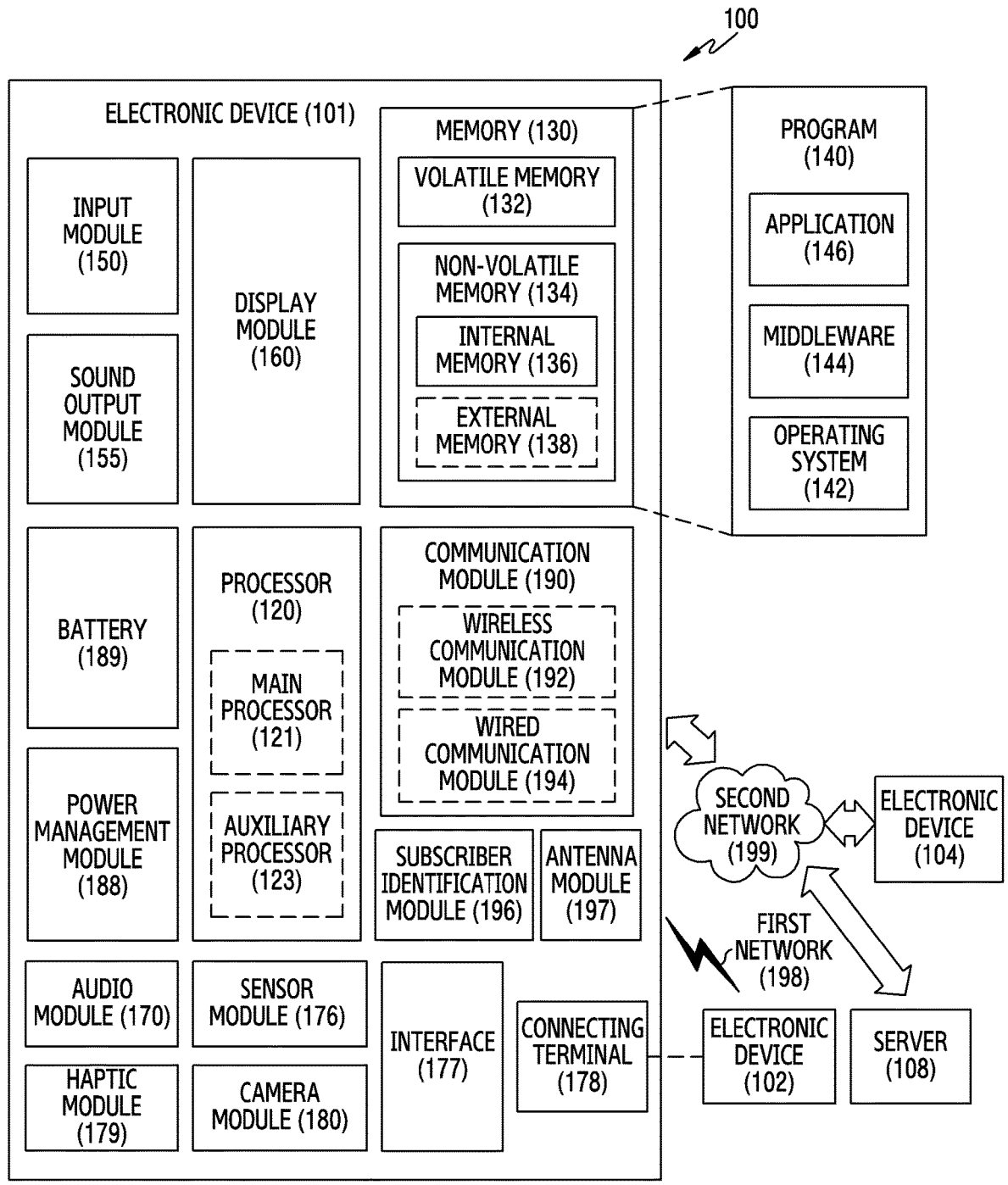
FIG. 1 is a view illustrating an electronic device according to an embodiment within a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
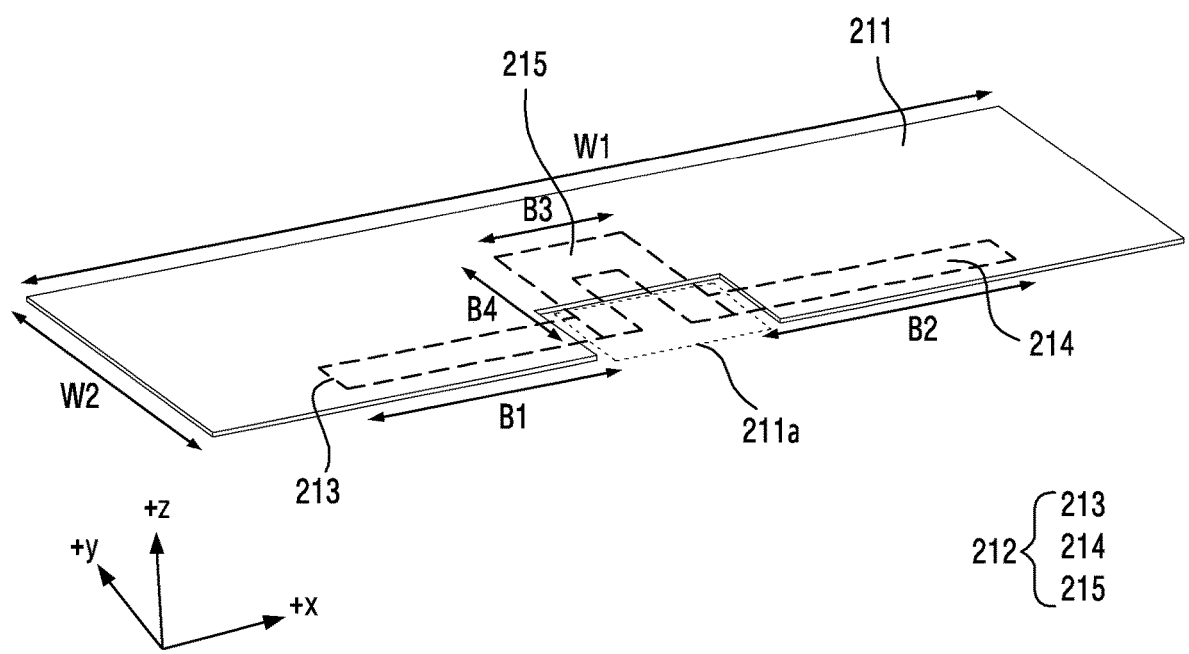
FIG. 2A is a perspective view of a metal plate and a conductive member acting as an antenna radiator according to an embodiment.

FIG. 2A is a perspective view of a metal plate and a conductive member acting as an antenna radiator according to an embodiment.

Referring to FIG. 2A, an electronic device 101 according to an embodiment may include a metal plate 211 and a conductive member 212. In an embodiment, the metal plate 211 may include or be formed to define a recess 211a. In an embodiment, the metal plate 211 may have a first length W1 (e.g., about 60 mm) in a second direction (e.g., a direction parallel to the x axis), and a second length W2 (e.g., about 10 mm) in a third direction (e.g., a direction parallel to the y axis). In an embodiment, the metal plate 211 is illustrated as having a rectangular shape including the recess 211a, but this is only an example, and in other embodiments, the metal plate 211 may have various shapes. The metal plate 211 may be used as an antenna radiator as will be described later with reference to FIG. 2C.

According to an embodiment, a location of the conductive member 212 may be in a first direction (e.g., the −z direction) perpendicular to one surface of the metal plate 211. In an embodiment, the conductive member 212 may include a first part 213 and a second part 214, which are elongated in a second direction (e.g., a direction parallel to the x axis), and a third part 215 that interconnects the first part 213 and the second part 214. The third part 215 may be U-shaped or hairpin-shaped. In an example, the first part 213 may have a first width B1 (e.g., about 19 mm) in the second direction (e.g., a direction parallel to the x axis), and the second part 214 may have a second width B2 (e.g., about 19 mm) in the second direction (e.g., a direction parallel to the x axis). In addition, the third part 215 may have a third width B3 (e.g., about 5 mm) in the second direction (e.g., a direction parallel to the x axis), and the third part 215 may have a fourth width B4 (e.g., about 5 mm) in a third direction (e.g., a direction parallel to the y axis).

It is to be understood, however, that the shape of the conductive member 212 illustrated in FIG. 2A is merely an example, and in other embodiments, the conductive member 212 may have various shapes. Embodiments regarding various shapes of the conductive member 212 will be described in detail below with reference to FIGS. 9A to 9C. In addition, although the conductive member 212 illustrated in FIG. 2A has a symmetrical shape, this is merely an example, and the conductive member 212 may have an asymmetrical shape. For example, conductive members to be described later with reference to FIGS. 9F and 9G may have asymmetric shapes.

Figure 2B:
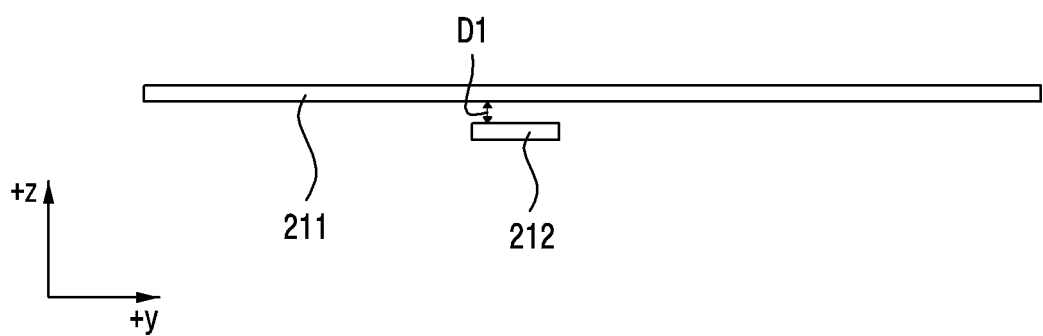
FIG. 2B is a view illustrating the metal plate and the conductive member according to an embodiment when viewed in the x-axis direction.

FIG. 2B is a view illustrating the metal plate and the conductive member according to an embodiment when viewed in the x-axis direction.

Referring to FIG. 2B, the metal plate 211 and the conductive member 212 according to an embodiment may be spaced apart from each other by a specific distance D1 (e.g., about 2 mm to 4 mm). As used herein, the specific distance may refer to a distance at which the metal plate 211 and the conductive member 212 can be electromagnetically connected to each other via a coupling. In an embodiment, the metal plate 211 may correspond to a coupler structure of the conductive member 212.

Figure 2C:
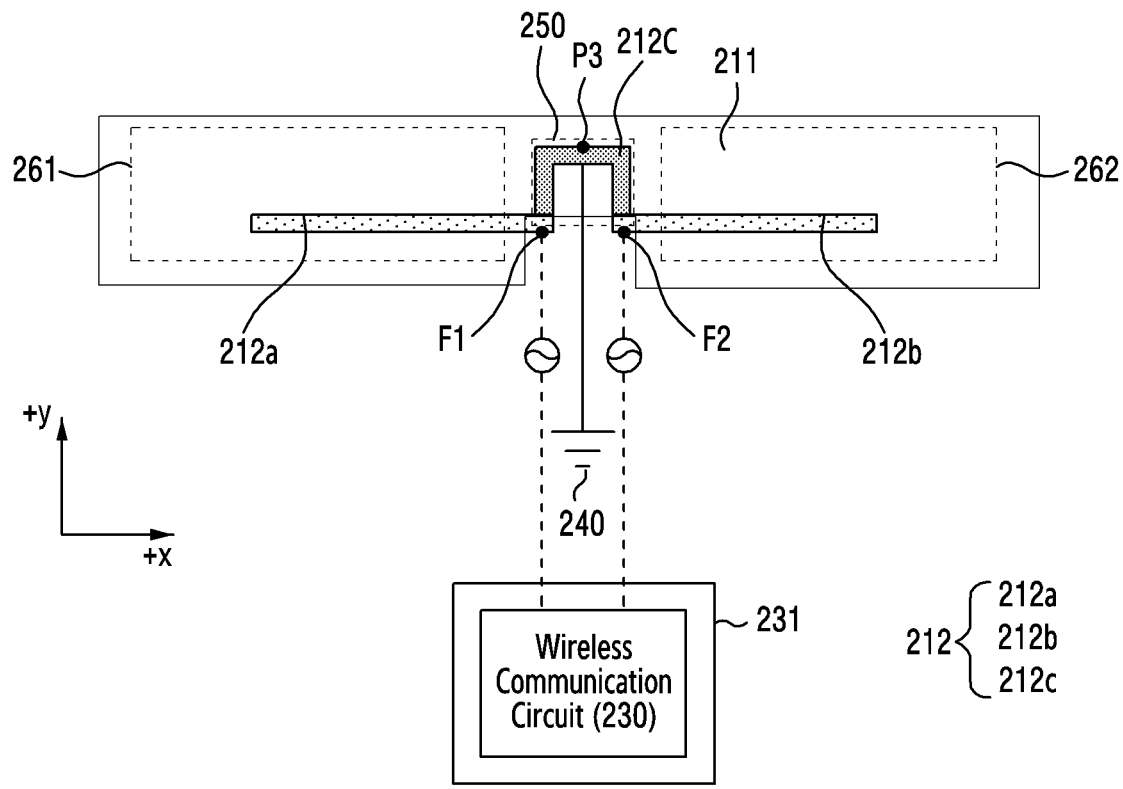
FIG. 2C is a view illustrating that the conductive member and the metal plate act as an antenna radiator as a wireless communication circuit according to an embodiment feeds power to the conductive member.

FIG. 2C is a view illustrating that the conductive member and the metal plate act as an antenna radiator as the wireless communication circuit according to an embodiment feeds power to the conductive member.

Referring to FIG. 2C, the electronic device 101 according to an embodiment may include a wireless communication circuit 230. The wireless communication circuit 230 may feed power to a first feeding point F1 and a second feeding point F2 of the conductive member 212. In an embodiment, the electronic device 101 may include a printed circuit board 231, and the wireless communication circuit 230 may be disposed on a printed circuit board 231.

According to an embodiment, the conductive member 212 may include a first portion 212a, a second portion 212b, and a third portion 212c that interconnects the first portion 212a and the second portion 212b. For example, as used herein, the first portion 212a of the conductive member 212 may refer to a portion including the first feeding point F1, and, as used herein, the second portion 212b may refer to a portion including the second feeding point F2. The third portion 212c of the conductive member 212 may have a U-shape or a hairpin-shape.

According to an embodiment, the electronic device 101 may include a ground 240. The ground 240 may be provided in various conductive structures (e.g., the printed circuit board 231) in the electronic device 101. For example, the ground 240 may be provided in a first layer among a plurality of conductive layers of the printed circuit board 231. As another example, the ground 240 may be provided on a flexible printed circuit board (FPCB) in the electronic device 101. As another example, the ground 240 may be provided in a conductive portion of an electronic component in the electronic device 101. In an embodiment, the ground 240 may be electrically connected to the third point P3 of the conductive member 212. The third point P3 may correspond to a point between the first feeding point F1 and the second feeding point F2 of the conductive member 212.

According to an embodiment, the coupling region 250 including the third point P3 of the conductive member 212 may overlap the metal plate 211 when viewed in the first direction (e.g., the −z direction). The range of the coupling region 250 including the third point P3 illustrated in FIG. 2C is the region between the first feeding point F1 and the second feeding point F2 of the conductive member 212 and is illustrated with reference to a region adjacent to the third point P3 electrically connected to the ground 240. However, it is to be understood that this is for convenience of description, and the range and size of the coupling region 250 may vary.

According to an embodiment, as the wireless communication circuit 230 feeds power to the first feeding point F1 and/or the second feeding point F2 of the conductive member 212, an electrical path may be formed in the metal plate 211. For example, as the wireless communication circuit 230 feeds power to the first feeding point F1 of the conductive member 212, a first electrical path may be formed in the first portion 212a of the conductive member 212 including the first feeding point F1 and a first region of the metal plate 211 corresponding to the first portion 212a. As another example, as the wireless communication circuit 230 feeds power to the second feeding point F2 of the conductive member 212, a second electrical path may be formed in a second region 262 of the metal plate 211. The first electrical path and the second electrical path may correspond to a first electrical path E1 and a second electrical path E2, respectively, which will be described later with reference to FIG. 3. As a result, the electronic device 101 may use the metal plate 211 and the conductive member 212 as an antenna radiator.

The sizes and ranges of the first region 261 and the second region 262 illustrated in FIG. 2C are arbitrarily indicated for convenience of description and are not limited to the sizes and ranges illustrated in FIG. 2C.

Figure 3:
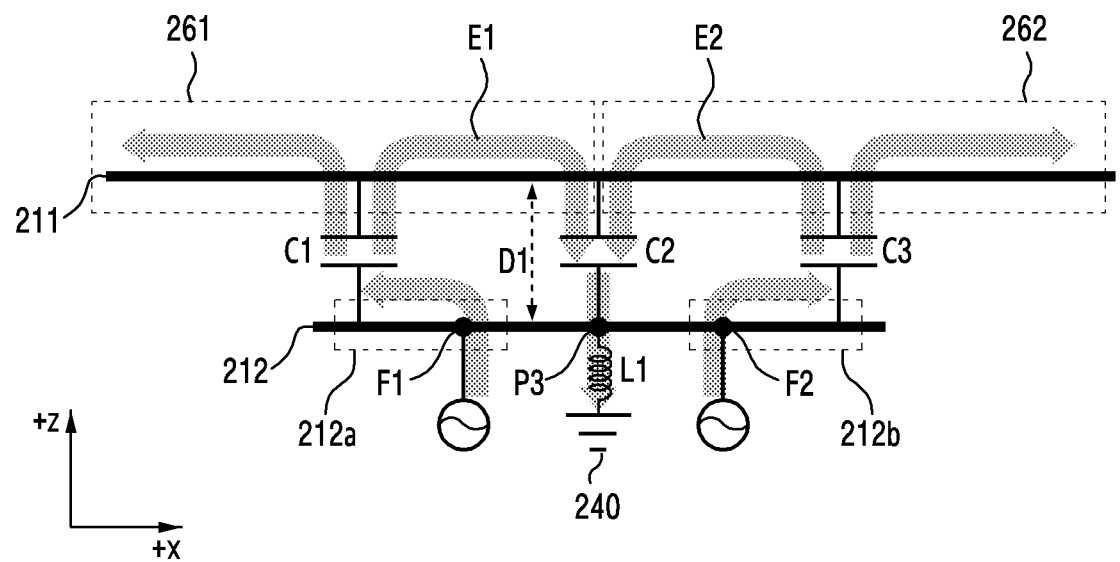
FIG. 3 is a view illustrating a first electrical path and a second electrical path according to an embodiment.

FIG. 3 is a view illustrating the first electrical path and the second electrical path according to an embodiment.

Referring to FIG. 3, the metal plate 211 and the conductive member 212 according to an embodiment may be spaced apart from each other by a specific distance D1 (e.g., about 2 mm to 4 mm). The specific distance D1 may refer to a distance at which the metal plate 211 and the conductive member 212 can be electromagnetically connected to each other via a coupling. Therefore, when the structure in which the metal plate 211 and the conductive member 212 are connected to each other via a coupling is simplified to an equivalent circuit, it may be assumed that a capacitor component is provided between the metal plate 211 and the conductive member 212. For example, a first capacitor C1, a second capacitor C2, and/or a third capacitor C3 may be provided between the metal plate 211 and the conductive member 212. In fact, a capacitor component will be provided in the entire region where the metal plate 211 and the conductive member 212 overlap. However, for convenience of description, the capacitor component provided in the left direction (e.g., the −x direction) of the first feeding point F1 with reference to FIG. 3 is the first feeding point F1 and the second feeding point F2 will be described as a first capacitor C1. The capacitor component provided between the first feeding point F1 and the second feeding point F2 will be described as a second capacitor C2, and the capacitor component provided in the right direction (e.g., the +x direction) of the second feeding point F2 will be described as a third capacitor C3.

According to an embodiment, when simplified to an equivalent circuit, it may be assumed that the conductive member 212 includes an inductance component due to the U-shaped or hairpin-shaped third portion (e.g., the third portion 212c in FIG. 2C). Accordingly, in consideration of the inductance component of the conductive member 212, it may be described that an inductor L1 is provided between the conductive member 212 and the ground 240.

According to an embodiment, as the wireless communication circuit 230 (see FIG. 2C) feeds power to the first feeding point F1 of the conductive member 212 (see FIG. 3), a first electrical path E1 may be formed in the first portion 212a of the conductive member 212 and the first region 261 of the metal plate 211. The wireless communication circuit 230 may transmit and/or receive a signal of a first frequency band (e.g., 2.4 GHz to 2.6 GHZ) based on the first electrical path E1. The first portion 212a of the conductive member 212 may have a length of ¼ of a wavelength corresponding to the first frequency band.

According to an embodiment, as the wireless communication circuit 230 (see FIG. 2C) feeds power to the second feeding point F2 of the conductive member 212 (see FIG. 3), a second electrical path E2 may be formed in the second portion 212b of the conductive member 212 and the second region 262 of the metal plate 211. As the wireless communication circuit 230 feeds power to the second feeding point F2 of the conductive member 212, the second electrical path E2 may be formed. The wireless communication circuit 230 may transmit and/or receive a signal of the first frequency band (e.g., 2.4 GHz to 2.6 GHz) or a second frequency band based on the second electrical path E2. As used herein, the second frequency band may refer to a frequency band adjacent to the first frequency band. The second portion 212b of the conductive member 212 may have a length of ¼ of a wavelength corresponding to the first frequency band or the second frequency band.

The first electrical path E1 and the second electrical path E2 illustrated in FIG. 3 are for convenience of description and are merely an example, and as the wireless communication circuit 230 feeds power to the conductive member 212, various electrical paths may be formed.

According to an embodiment, by using the conductive member 212 and a metal plate 211 having a larger volume than the conductive member 212 together as an antenna radiator, it is possible for the electronic device 101 to secure a relatively high antenna efficiency compared to a case in which there is no metal plate 211 (e.g., only the conductive member 212 is used as an antenna radiator).

According to an embodiment, in the electronic device 101, since the third point P3 connected to the ground 240 is located between the first feeding point F1 and the second feeding point F2, and the ground 240 is electromagnetically connected to the metal plate 211 acting as an antenna radiator via a coupling, it is possible to secure isolation of electrical paths formed on the conductive member 212 and the metal plate 211. For example, even if the wireless communication circuit 230 feeds power to a plurality of points (e.g., the first feeding point F1 and the second feeding point F2) of the conductive member 212, each of the electrical paths formed by feeding power to each of the plurality of points may not affect each other. As an example, the first electrical path E1 formed as the wireless communication circuit 230 feeds power to the first feeding point F1 of the conductive member 212 may be grounded to the ground 240 via a coupling without being formed in the second region 262 of the metal plate 211. As another example, the second electrical path E2 formed as the wireless communication circuit 230 feeds power to the second feeding point F2 of the conductive member 212 may be grounded to the ground 240 via a coupling without being formed in the first region 261 of the metal plate 211.

In contrast, assuming that the metal plate 211 is not electrically connected to the ground 240 via a coupling (the second capacitor C2 is not provided), the electrical path formed as the wireless communication circuit 230 feeds power to the first power feeding point F1 may be formed in the second region 262 of the metal plate 211 and the second portion 212b of the conductive member 212. In this case, the electrical path formed as the wireless communication circuit 230 feeds power to the first feeding point F1 and the electrical path formed by feeding power to the second feeding point F2 may cause interference therebetween.

As a result, as the metal plate 211 acting as an antenna radiator according to an embodiment and the ground 240 are electromagnetically connected to each other via a coupling, in the electronic device 101, it is possible to prevent mutual interference of multiple electrical paths formed in the conductive member 212 and the metal plate 211 and to secure the isolation of the antennas including the metal plate 211 and the conductive member 212.

Figure 4:
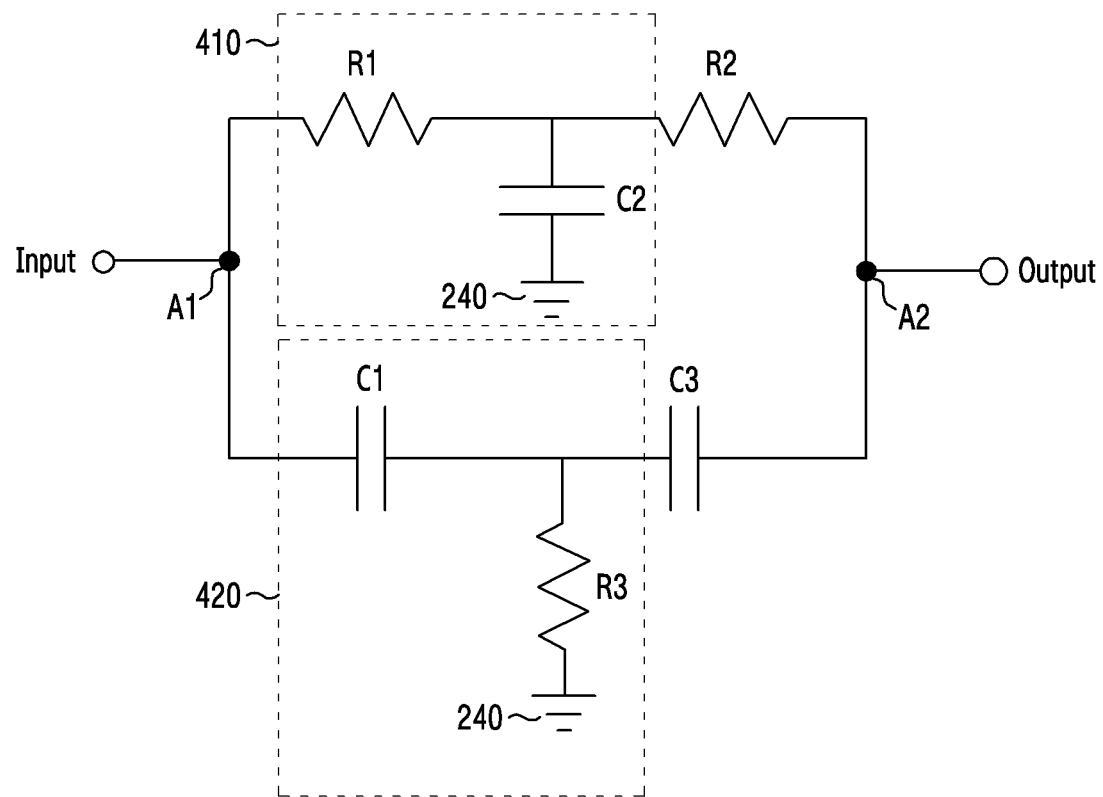
FIG. 4 illustrates an equivalent circuit diagram of a metal plate and a conductive member according to an embodiment.

FIG. 4 illustrates an equivalent circuit diagram of a metal plate and a conductive member according to an embodiment.

Considering the correspondence between the configuration illustrated in FIG. 3 and the circuit diagram illustrated in FIG. 4, a first resistor R1 may correspond to the first region 261 of the metal plate 211 (see FIG. 3), a second resistor R2 may correspond to the second region 262 of the metal plate 211 (see FIG. 3), and a third resistor R3 may correspond to the conductive member 212 (see FIG. 3).

Referring to FIG. 4, the resistance values of the first resistor R1 and the second resistor R2 according to an embodiment may correspond to about twice the resistance value of the third resistor R3. For example, when the third resistor R3 has a resistance value of R, the first resistor R1 and the second resistor R2 may each have a resistance value of 2R. In an embodiment, the capacitance value of the second capacitor C2 may correspond to about twice the capacitance value of the first capacitor C1 and the third capacitor C3. For example, when the capacitance value of each of the first capacitor C1 and the third capacitor C3 is C, the capacitance value of the second capacitor C2 may correspond to 2C.

According to an embodiment, a first circuit portion 410 including the first resistor R1 and the second capacitor C2 may correspond to or be arranged as a low-pass filter. In an embodiment, a second circuit portion 420 including the third resistor R3 and the first capacitor C1 may correspond to or be arranged as a high-pass filter. In an embodiment, when an input voltage is applied to a first node A1, a signal of a specific frequency band (e.g., the first frequency band) between a first cutoff frequency f1 of the low-pass filter and a second cutoff frequency f2 of the high-pass filter may be cut off at an output voltage at a second node A2. As used herein, the term "specific frequency band" may refer to a substantial cutoff frequency band.

As a result, a signal of the specific frequency band (e.g., the first frequency band) among signals input to the first node A1 may be cut off by the low-pass filter and the high-pass filter when measured at the second node A2.

According to the above-described principle, in the electronic device 101, it is possible to prevent interference caused between the first electrical path E1 formed by feeding power to the first feeding point F1 of the conductive member 212 and the second electrical path E2 formed by feeding power to the second feeding point F2 of the conductive member 212. As a result, in the electronic device 101, it is possible to secure the isolation of antennas including the metal plate 211 and the conductive member 212.

According to an embodiment, the cutoff frequency band (e.g., the first frequency band) may vary depending on the first cutoff frequency f1 of the low-pass filter and the second cutoff frequency f2 of the high-pass filter. Meanwhile, the first cutoff frequency f1 of the low-pass filter may be determined based on the capacitance value of the first capacitor C1, and the capacitance value of the first capacitor C1 may be determined based on the separation distance D1 (see FIG. 3) between the metal plate 211 and the conductive member 212 and the overlapping area of the coupling region 250 illustrated in FIG. 2C.

As a result, the cutoff frequency band may be determined depending on the separation distance D1 between the metal plate 211 and the conductive member 212 and the overlapping area of the coupling region 250. Hereinafter, the cutoff frequency band and the isolation depending on the separation distance D1 between the metal plate 211 and the conductive member 212 and the overlapping area of the coupling region 250 will be described in detail with reference to FIGS. 7 and 8.

Figure 5:
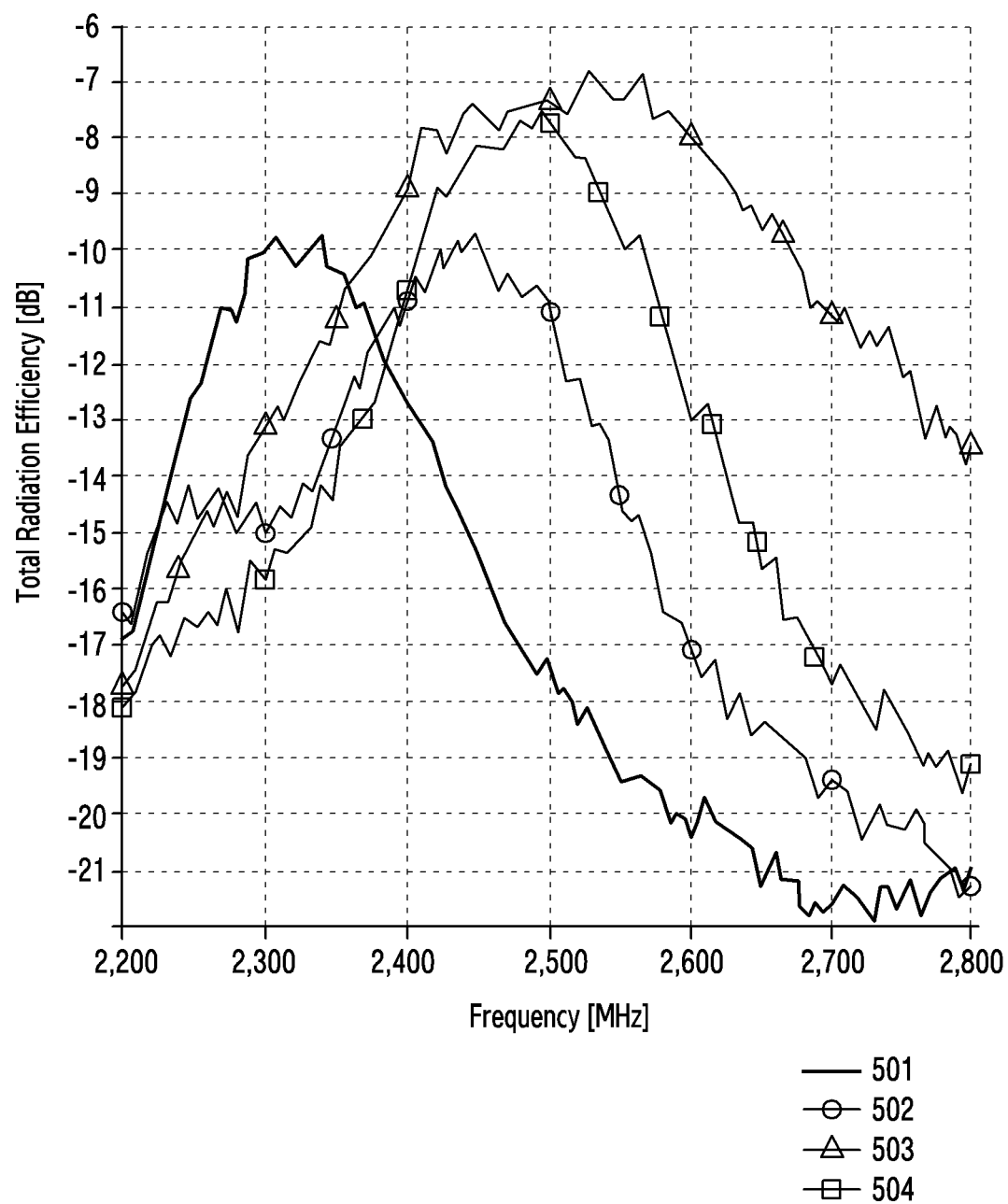
FIG. 5 is a view showing antenna radiation efficiencies when the metal plate according to an embodiment is electrically connected to the ground via a coupling and when the metal plate is not connected to the ground.

FIG. 5 is a view showing antenna radiation efficiencies when the metal plate according to an embodiment is electrically connected to the ground via a coupling and when the metal plate is not connected to the ground.

Referring to FIG. 5, under the condition in which the metal plate 211 is not electrically connected to the ground 240 via a coupling, the antenna radiation efficiency graph points based on an electrical path formed when the wireless communication circuit 230 feeds power to the first feeding point F1 may be referred to as first graph points 501, and the antenna radiation efficiency graph points based on an electrical path formed when the wireless communication circuit 230 feeds power to the second feeding point F2 may be referred to as second graph points 502.

According to an embodiment, under the condition in which the metal plate 211 is electrically connected to the ground 240 via a coupling, the antenna radiation efficiency graph points based on an electrical path (e.g., the electrical path E1) formed as the wireless communication circuit 230 feeds power to the first feeding point F1 may be referred to as third graph points 503, and the antenna radiation efficiency graph points based on an electrical path (e.g., the second electrical path E2) formed when the wireless communication circuit 230 feeds power to the second feeding point F2 may be referred to as fourth graph points 504.

The first graph points 501 show a value of about −10 dB at about 2.3 GHz, and the second graph points 502 show a value of about −10 dB at about 2.45 GHz. In contrast, the third graph points 503 according to an embodiment show a value of about −7 dB in the about 2.5 to 2.6 GHz band, and the fourth graph points 504 show a value of about −8 dB in the about 2.5 GHz band. As a result, in the electronic device 101, by allowing the metal plate 211 to be electrically connected to the ground 240 via a coupling, it is possible to improve the antenna radiation efficiency by about −2 dB to −3 dB compared to the case in which the metal plate 211 is not electrically connected to the ground 240.

Accordingly, in the electronic device 101, by allowing the metal plate 211 to be electrically connected to the ground 240 via a coupling, it is possible to prevent interference between electrical paths formed as the wireless communication circuit 230 feeds power to a plurality of points (e.g., the first point F1 and the second feeding point F2) of the conductive member 212. As a result, it is possible to improve the antenna radiation efficiency in the electronic device 101.

Figure 6:
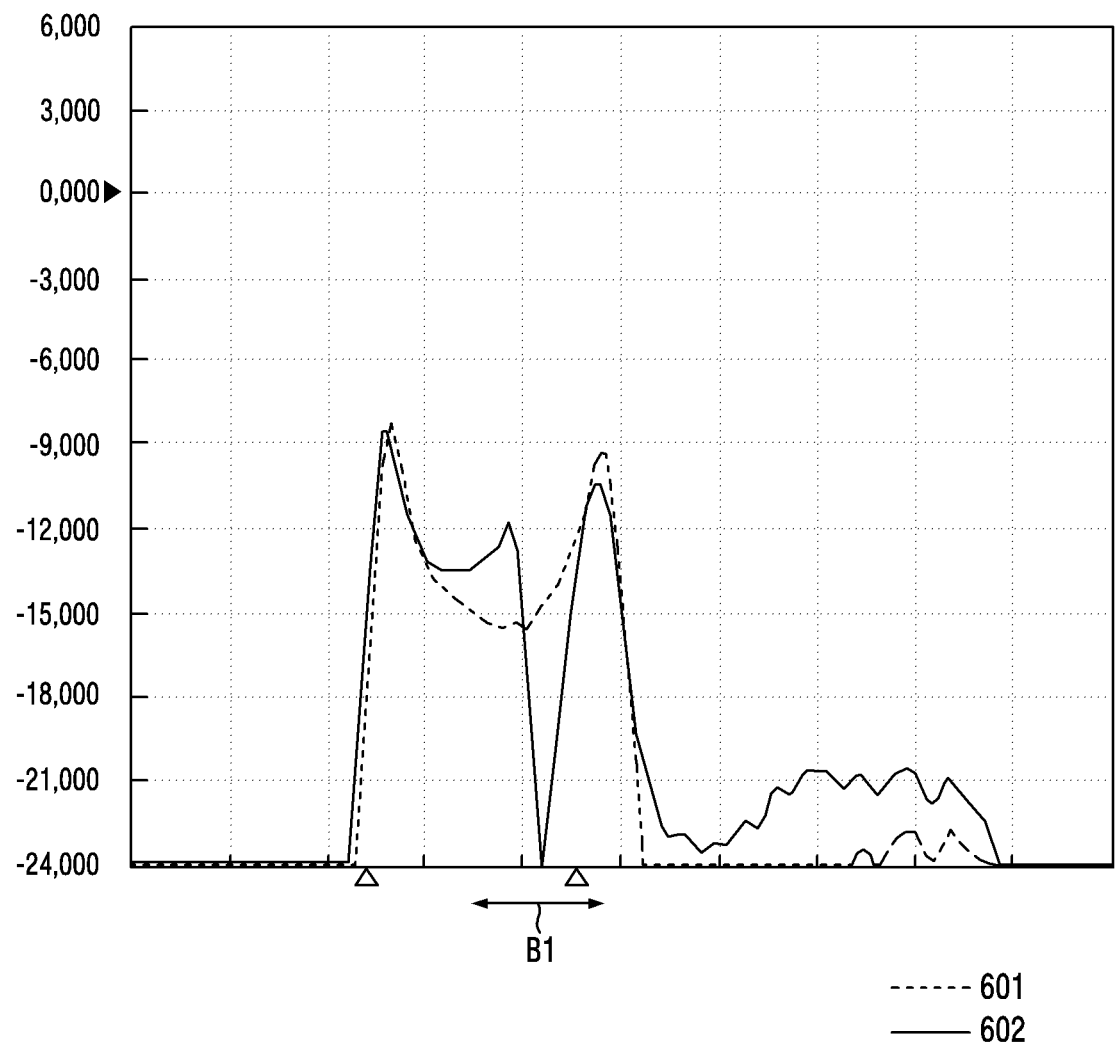
FIG. 6 shows an S21 graph in the case in which power is fed to a plurality of points of a conductive member according to an embodiment.

FIG. 6 shows an S21 graph in the case in which power is fed to a plurality of points of a conductive member according to an embodiment.

Referring to FIG. 6, the S21 graph according to an embodiment correspond to graph points for describing isolation characteristics, and may indicate the degree of interference or isolation characteristic of electrical paths formed when the wireless communication circuit 230 feeds power to a plurality of points (e.g., the first feeding point F1 and the second feeding point F2) of the conductive member 212. For example, the S21 graph points may be referred to as graph points indicating a ratio of output voltage to input voltage.

The first graph points 601 show an isolation characteristic when the metal plate 211 according to an embodiment is not electrically connected to the ground 240 via a coupling. The second graph points 602 according to an embodiment show an isolation characteristic when the metal plate 211 is electrically connected to the ground 240 via a coupling.

When comparing the second graph points 602 according to an embodiment with the first graph points 601, the second graph points 602 in a specific frequency band B1 (e.g., the first frequency band) have a lower S21 value than that of the first graph points 601. Therefore, when the metal plate 211 is connected to the ground 240 via a coupling, it is possible to prevent interference between electrical paths even if the wireless communication circuit 230 feeds power to a plurality of points of the conductive member 212 compared to the case in which the metal plate 211 is not connected to the ground. As a result, in the electronic device 101, it is possible to secure the high isolation of antennas including the metal plate 211 and the conductive member 212.

Figure 7A:
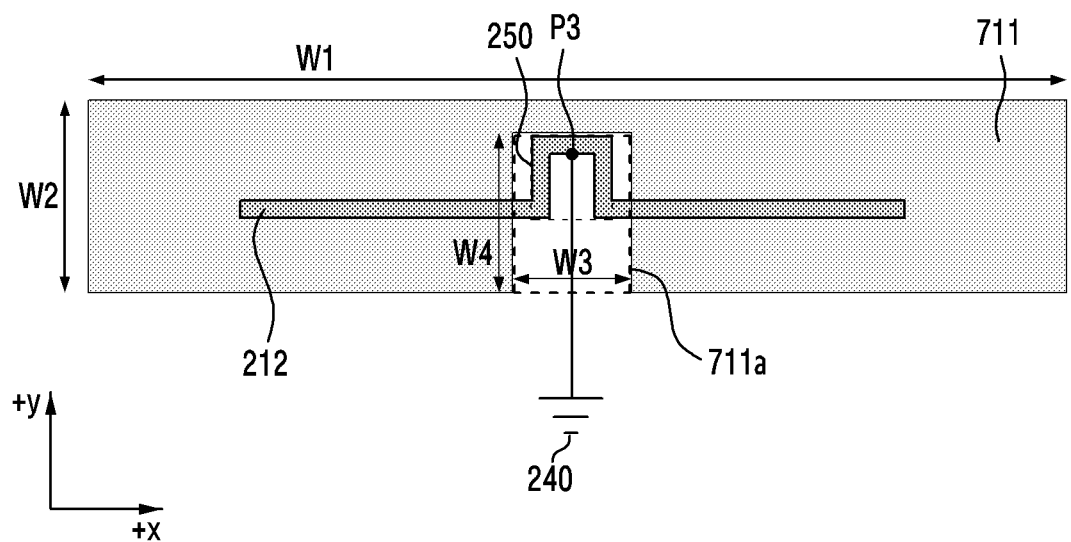
FIG. 7A is a view illustrating an overlapping area of a first metal plate including a first recess and a conductive member according to an embodiment.

FIG. 7A is a view illustrating an overlapping area of a first metal plate including a first recess and a conductive member according to an embodiment.

Figure 7B:
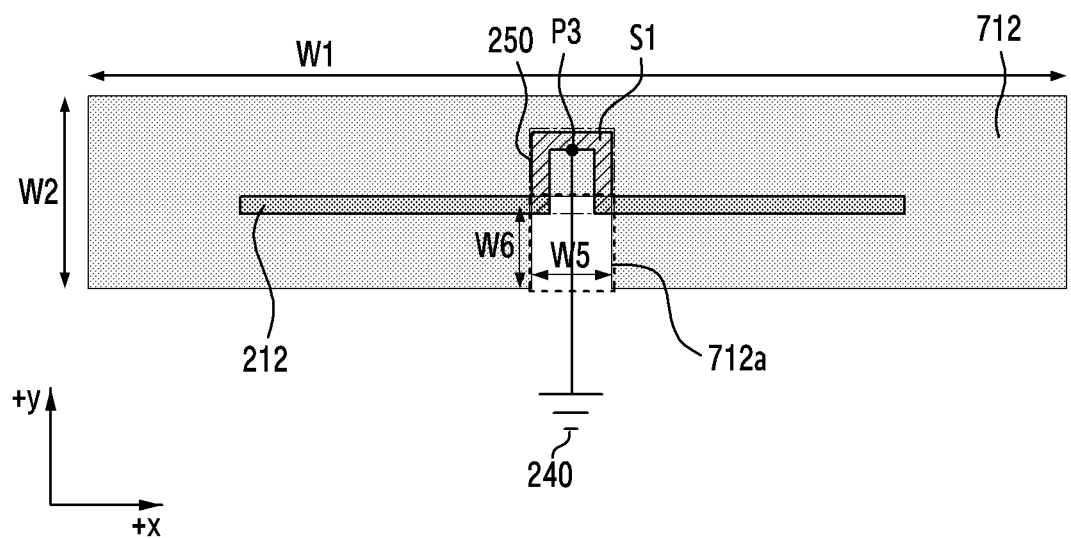
FIG. 7B is a view illustrating an overlapping area of a second metal plate including a second recess and a conductive member according to an embodiment.

FIG. 7B is a view illustrating an overlapping area of a second metal plate including a second recess and a conductive member according to an embodiment.

Figure 7C:
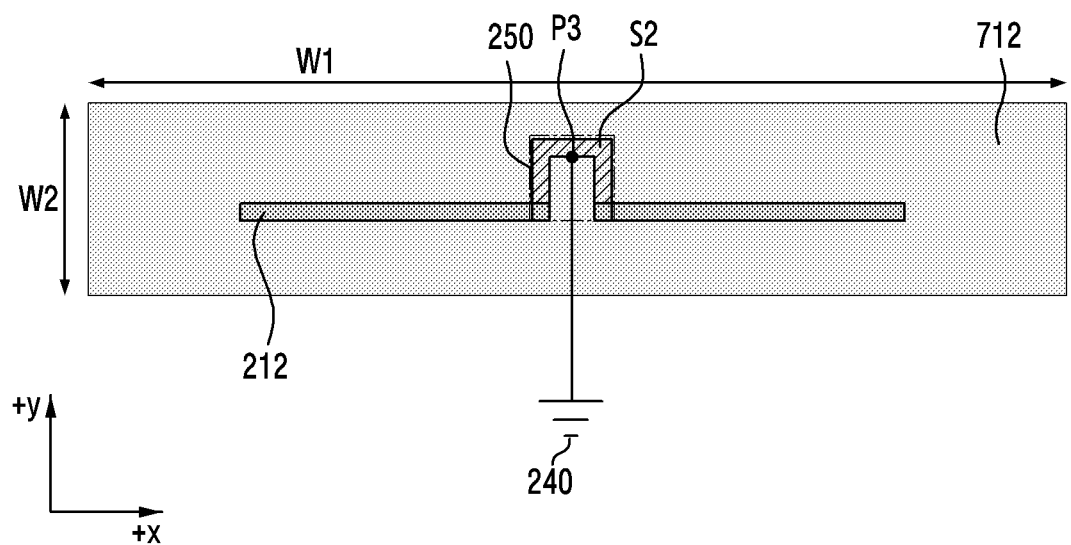
FIG. 7C is a view illustrating an overlapping area of a third metal plate not including a recess and a conductive member according to an embodiment.

FIG. 7C is a view illustrating an overlapping area of a third metal plate not including a recess and a conductive member according to an embodiment.

Referring to FIG. 7A, the first metal plate 711 may have a first length W1 (e.g., about 60 mm) in the horizontal direction (e.g., the x-axis direction) and may have a second length W2 (e.g., about 10 mm) in the vertical direction (e.g., the y-axis direction). The first metal plate 711 may include a first recess 711a, wherein the first recess 711a may have a third length W3 (e.g., about 8 mm) in the horizontal direction (e.g., the x-axis direction) and may have a fourth length W4 (e.g., about 8 mm) in the vertical direction (e.g., the y-axis direction). In this case, the coupling region 250 of the conductive member 212 that includes the third point P3 connected to the ground 240 and the first metal plate 711 may not overlap or may overlap each other in a relatively smaller region compared to the embodiment of FIGS. 7B and 7C to be described later.

Referring to FIG. 7B, the second metal plate 712 according to an embodiment may have a first length W1 (e.g., about 60 mm) in the horizontal direction (e.g., the x-axis direction) and may have a second length W2 (e.g., about 10 mm) in the vertical direction (e.g., the y-axis direction). The second metal plate 712 may include a second recess 712a, wherein the second recess 712a may have a fifth length W5 (e.g., about 5 mm) in the horizontal direction (e.g., the x-axis direction), and may have a sixth length W6 (e.g., about 5 mm) in the vertical direction (e.g., the y-axis direction). In this case, the coupling region 250 of the conductive member 212 that includes the third point P3 connected to the ground 240 and the second metal plate 712 may overlap each other by a first area S1.

Referring to FIG. 7C, the third metal plate 713 according to an embodiment may have a first length W1 (e.g., about 60 mm) in the horizontal direction (e.g., the x-axis direction) and may have a second length W2 (e.g., about 10 mm) in the vertical direction (e.g., the y-axis direction). The third metal plate 713 may not include a separate recess. In this case, the coupling region 250 of the conductive member 212 that includes the third point P3 connected to the ground 240 and the third metal plate 713 may overlap each other by a second area S2. The second area S2 may be larger than the first area S1 of FIG. 7B.

Figure 8A:
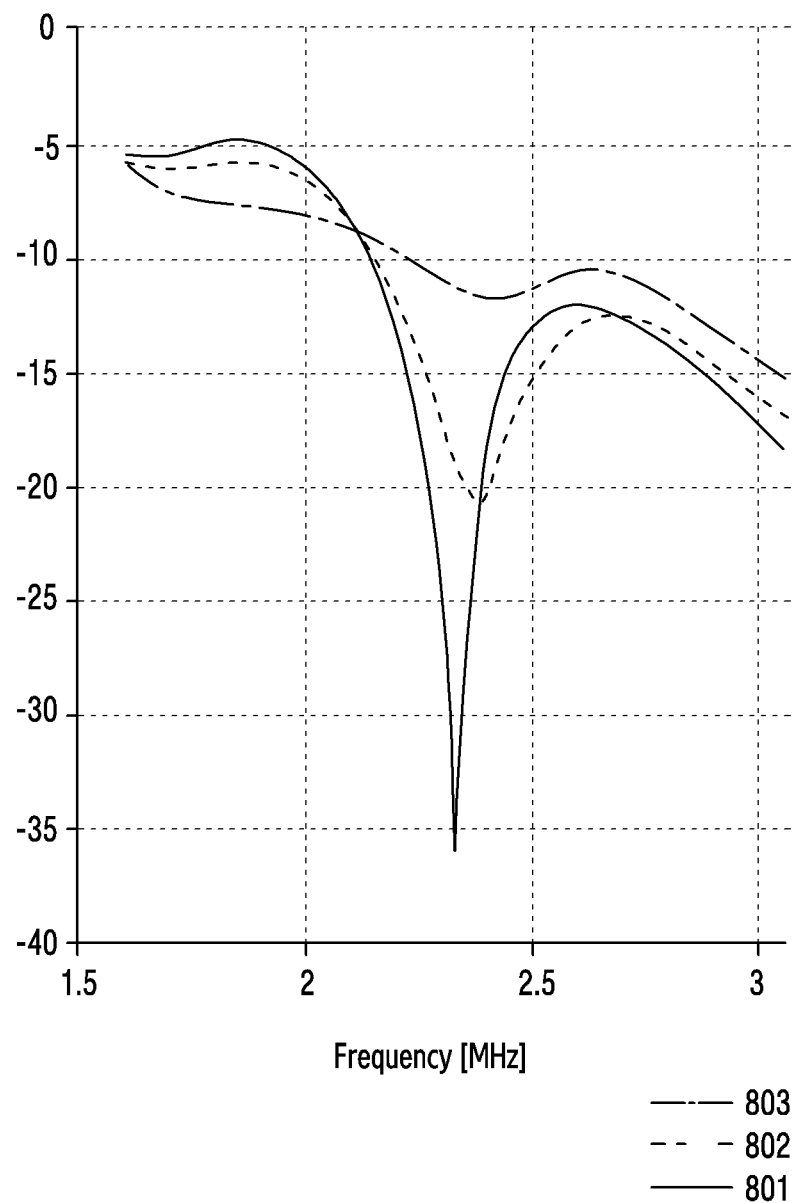
FIG. 8A illustrates an S21 graph according to overlapping areas according to an embodiment.

FIG. 8A illustrates an S21 graph according to overlapping areas according to an embodiment.

Referring to FIG. 8A, the first graph points 801 are an S21 graph when power is supplied to a plurality of points of the conductive member 212 in the embodiment of the first metal plate 711 and the conductive member 212 illustrated in FIG. 7A. In an embodiment, the second graph points 802 are an S21 graph when power is supplied to a plurality of points of the conductive member 212 in the embodiment of the second metal plate 712 and the conductive member 212 illustrated in FIG. 7B. In an embodiment, the third graph points 803 are an S21 graph when power is supplied to a plurality of points of the conductive member 212 in the embodiment of the third metal plate 713 and the conductive member 212.

According to an embodiment, the third graph points 803 have a relatively higher S21 value than the first graph points 801 and the second graph points 802 in a specific frequency band (e.g., about 2.1 GHZ to 2.7 GHz). Similarly, the second graph points 802 have a relatively higher S21 value than the first graph points 801 in a specific frequency band (e.g., about 2.1 GHZ to 2.7 GHZ). As a result, the embodiment of the first metal plate 711 and the conductive member 212 illustrated in FIG. 7A may secure the relatively higher isolation of antennas than the embodiment illustrated in FIGS. 7B and 7C.

In an embodiment, the cutoff frequency band may vary depending on an overlapping area of the coupling region 250 of the conductive member 212 and the metal plate 211. For example, compared to those in the case in which the overlapping area is the first area S1 as illustrated in FIG. 7B and the case the overlapping area is the second area S2 as illustrated in FIG. 7C, the cutoff frequency band in the case in which the coupling region 250 of the conductive member 212 overlaps the first metal plate 211 in a relatively small area or does overlapping area or does not overlap the first metal plate 211 as illustrated in FIG. 7A may correspond to a specific frequency band (e.g., about 2.1 GHz to 2.7 GHZ).

As a result, in the electronic device 101, it is possible to adjust the overlapping area of the metal plate (e.g., the metal plate 211 of FIG. 2A) and the conductive member 212 to correspond to a desired cutoff frequency band at the time of design, and through this, it is possible to secure the isolation of antennas.

Figure 8B:
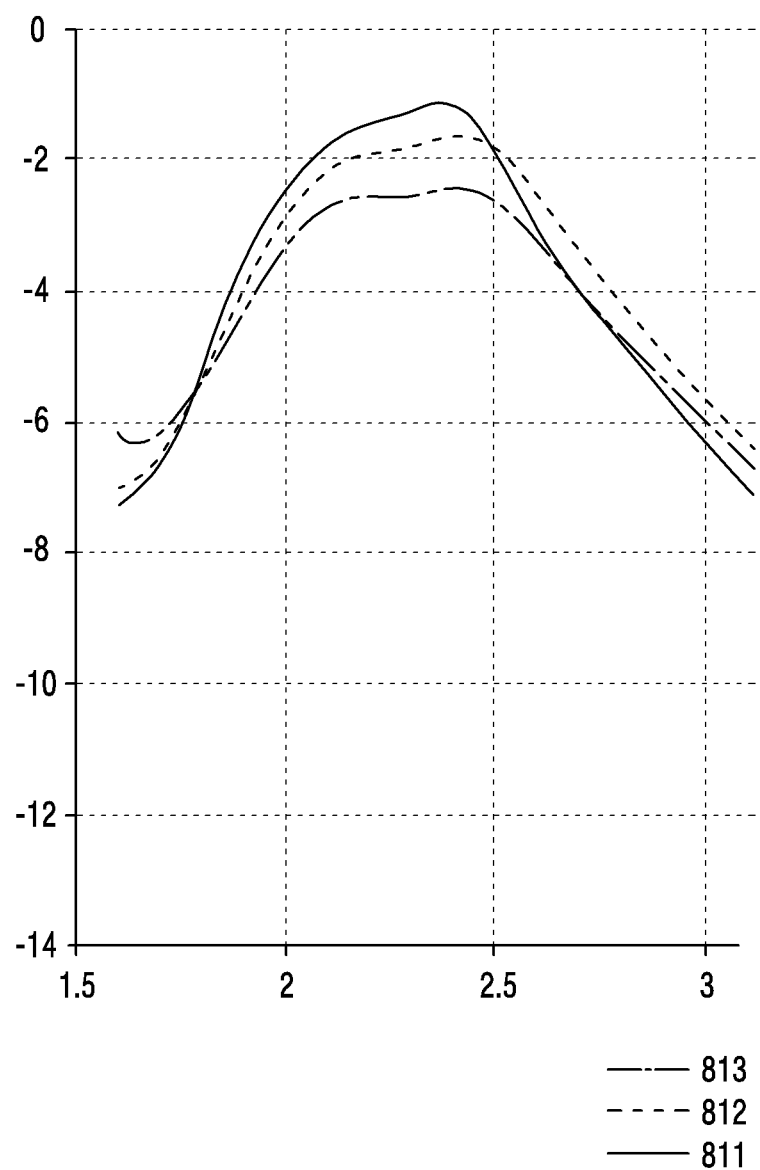
FIG. 8B shows antenna radiation efficiency graphs according to overlapping areas according to an embodiment.

FIG. 8B shows antenna radiation efficiency graphs according to overlapping areas according to an embodiment.

Referring to FIG. 8B, the first graph points 811 are an antenna radiation efficiency graph when power is supplied to a plurality of points of the conductive member 212 in the embodiment of the first metal plate 711 and the conductive member 212 illustrated in FIG. 7A. In an embodiment, the second graph points 812 are an antenna radiation graph when power is supplied to a plurality of points of the conductive member 212 in the embodiment of the second metal plate 712 and the conductive member 212 illustrated in FIG. 7B. In an embodiment, the third graph points 813 are an antenna radiation graph when power is supplied to a plurality of points of the conductive member 212 in the embodiment of the third metal plate 713 and the conductive member 212.

In an embodiment, the first graph points 811 have a relatively high antenna radiation efficiency in a specific frequency band (e.g., about 2 GHz to 2.5 GHz) compared to the second graph points 812 and the third graph points 813. In addition, the second graph points 812 have a relatively high antenna radiation efficiency in a specific frequency band (e.g., about 2 GHz to 2.5 GHZ) compared to the third graph 813. As a result, in the electronic device 101, it is possible to improve the antenna radiation efficiency by preventing mutual interference of electrical paths formed depending on the feeding of power to a plurality of points.

Figure 9A:
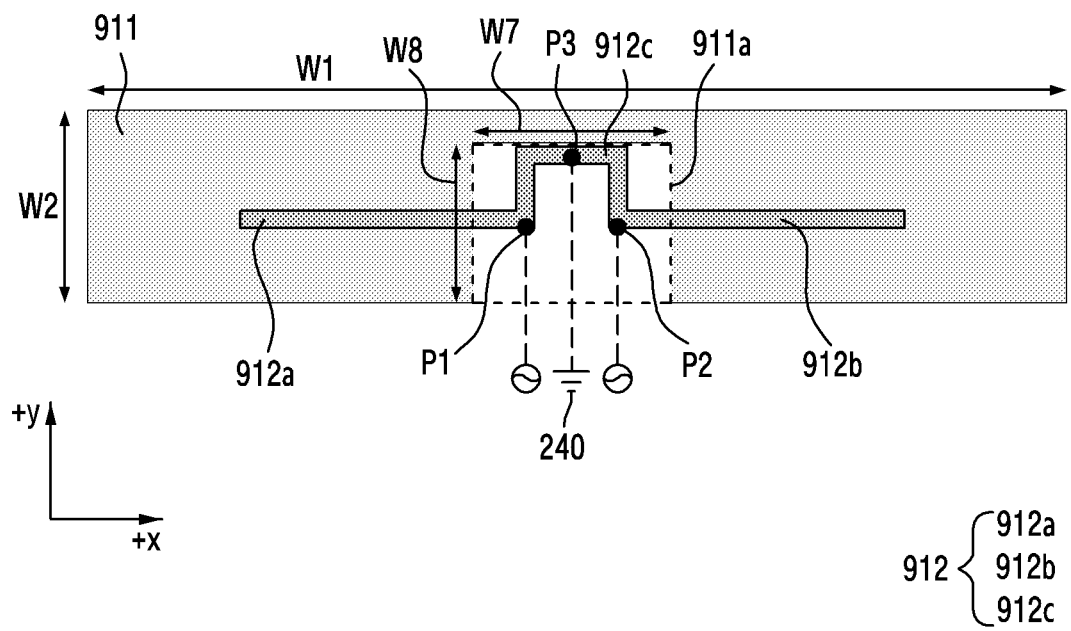
FIG. 9A is a view illustrating a metal plate and a conductive member according to an embodiment.

FIG. 9A is a view illustrating a metal plate and a conductive member according to an embodiment.

Referring to FIG. 9A, the metal plate 911 according to an embodiment may include a recess 911a. The size of the recess 911a may be larger than the size of the first recess 711a of the first metal plate 711 illustrated in FIG. 7A. For example, the recess 911a may have a seventh length W7 in the horizontal direction (e.g., a direction parallel to the x-axis) and an eighth length W8 in the vertical direction (e.g., a direction parallel to the y-axis). The seventh length W7 and the eighth length W8 of the recess 911a may be greater, respectively, than the third length W3 and the fourth length W4 of the first recess 711a illustrated in FIG. 7A.

In an embodiment, the conductive member 912 may include a first portion 912a and a second portion 912b, which are elongated in the x-axis direction, and may include a third portion 912c that interconnects the first portion 912a and the second portion 912b. In an embodiment, the wireless communication circuit 230 may feed power to the first point P1 and the second point P2 of the conductive member 912, and the ground 240 may be electrically connected to the third point P3 of the conductive member 912.

Figure 9B:
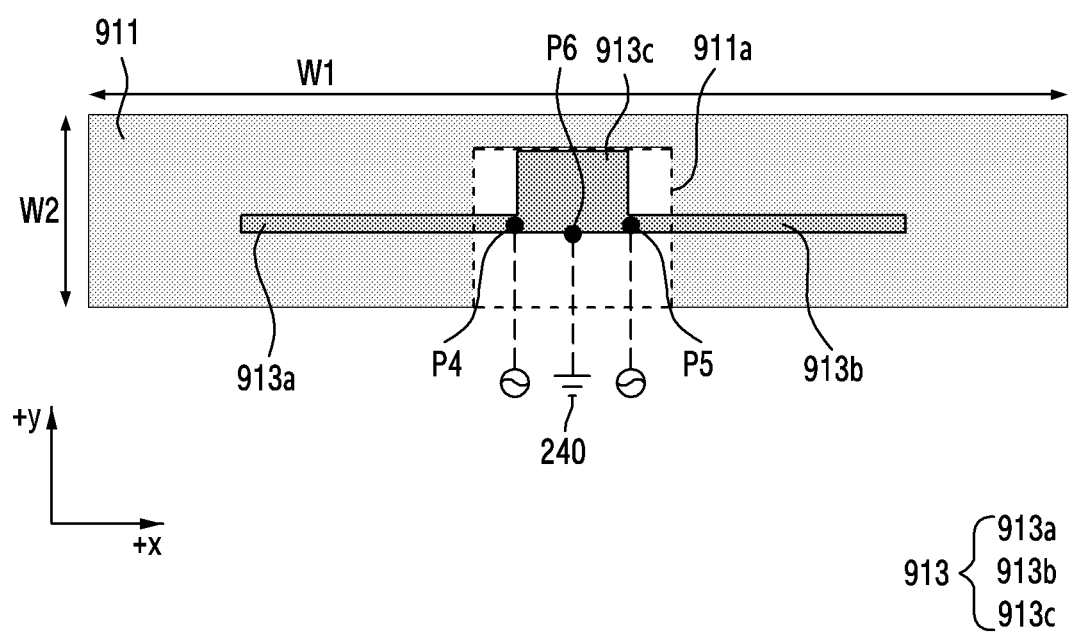
FIG. 9B is a view illustrating an embodiment of a conductive member having a shape different from that of the conductive member illustrated in FIG. 9A according to an embodiment.

FIG. 9B is a view illustrating an embodiment of a conductive member having a shape different from that of the conductive member illustrated in FIG. 9A according to an embodiment.

Referring to FIG. 9B, the conductive member 913 according to an embodiment may include a first portion 913a and a second portion 913b that are elongated in a first direction (e.g., the x-axis direction), and may include a third portion 913c that connects the first portion 913a and the second portion 913b. The third portion 913c may have, for example, a rectangular shape. In an embodiment, a first length from the center of the metal plate 911 to the first end of the metal plate 911 (e.g., ½ of the first length W1) may be longer than a second length from the center of the conductive member 913 to a second end of the conductive member 913.

In an embodiment, the wireless communication circuit 230 may feed power to a fourth feeding point P4 and a fifth feeding point P5 of the conductive member 913. The conductive member 913 may be electrically connected to the ground 240 at a sixth point P6.

Figure 9C:
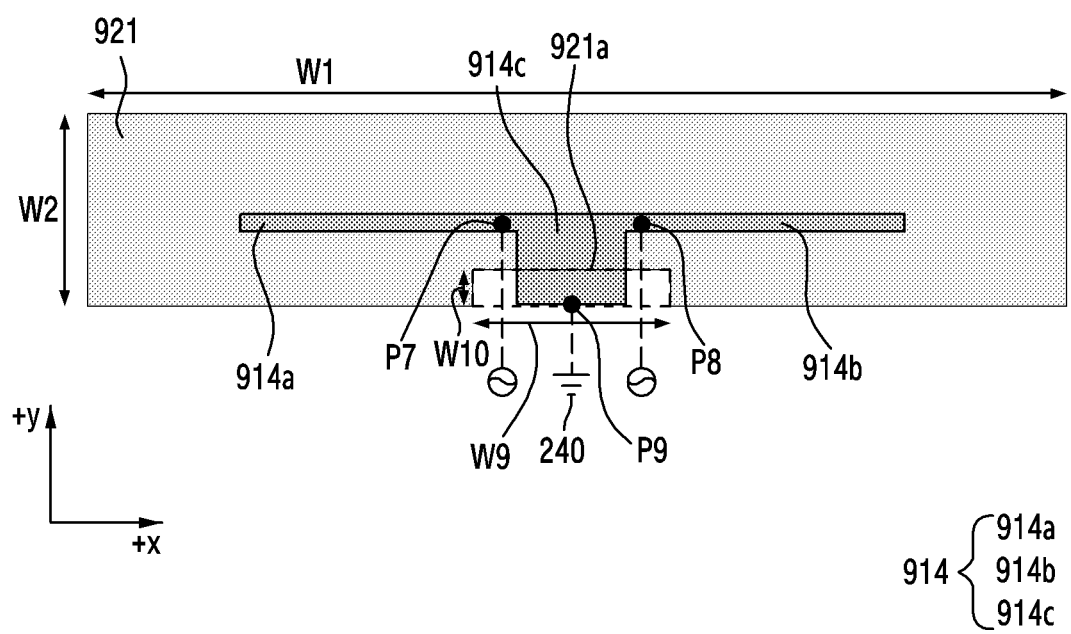
FIG. 9C is a view illustrating an embodiment of a metal plate and a conductive member having shapes different from those of the metal plate and the conductive member illustrated in FIG. 9A according to an embodiment.

FIG. 9C is a view illustrating an embodiment of a metal plate and a conductive member having shapes different from those of the metal plate and the conductive member illustrated in FIG. 9A according to an embodiment.

Referring to FIG. 9C, the metal plate 921 according to an embodiment may include a recess 921a having a smaller size than the recess 911a of the metal plate 911 illustrated in FIG. 9A. For example, the recess 921a may have a ninth length W9 in the horizontal direction (e.g., a direction parallel to the x-axis) and a tenth length W10 in the vertical direction (e.g., a direction parallel to the y-axis). The ninth length W9 and the tenth length W10 of the recess 921a may be smaller, respectively, than the seventh length W7 and the eighth length W8 of the recess 911a illustrated in FIG. 9A.

In an embodiment, the conductive member 914 may include a first portion 914a and a second portion 914b that are elongated in a first direction (e.g., the x-axis direction), and may include a third portion 914c that connects the first portion 914a and the second portion 914b. The third portion 914c may have a rectangular shape. Unlike the conductive member 913 illustrated in FIG. 9B, in the conductive member 914 illustrated in an embodiment, the third portion 914c of the conductive member 914 may be provided to protrude more than the first portion 914a and the second portion 914b in a second direction (e.g., the −y direction).

In an embodiment, the wireless communication circuit 230 may feed power to a seventh feeding point P7 and an eighth feeding point P8 of the conductive member 914. The conductive member 914 may be electrically connected to the ground 240 at a ninth point P9.

Figure 9D:
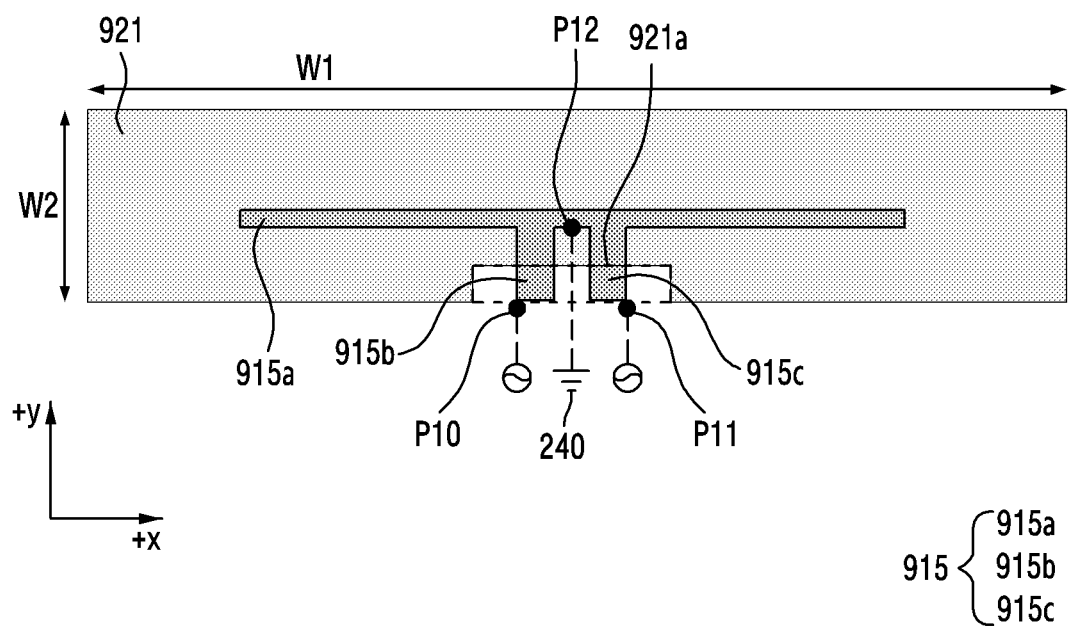
FIG. 9D is a view illustrating an embodiment of a conductive member having a shape different from that of the conductive member illustrated in FIG. 9C according to an embodiment.

FIG. 9D is a view illustrating an embodiment of a conductive member having a shape different from that of the conductive member illustrated in FIG. 9C according to an embodiment.

Referring to FIG. 9D, the conductive member 915 according to an embodiment may include a first portion 915a that is elongated in a first direction (e.g., the x-axis direction), and a second portion 915b and a third portion 915c that extend from the first portion 915a in a second direction (e.g., the −y direction). In an embodiment, the wireless communication circuit 230 may feed power to a tenth feeding point P10 and an eleventh feeding point P11 of the conductive member 915. The conductive member 915 may be electrically connected to the ground 240 at a twelfth point P12.

The shapes of the metal plates and the conductive members illustrated in FIGS. 9A to 9D are an example, and in fact, the shapes of the metal plate and the conductive member may have various shapes other than those illustrated in FIGS. 9A to 9D.

In addition, FIGS. 9A to 9D illustrates embodiments for describing various shapes of the metal plates and the conductive members, and the descriptions of the metal plates and conductive members illustrated in FIGS. 2A to 8B may also be applied to those having various shapes as illustrated in FIGS. 9A to 9D.

Figure 9E:
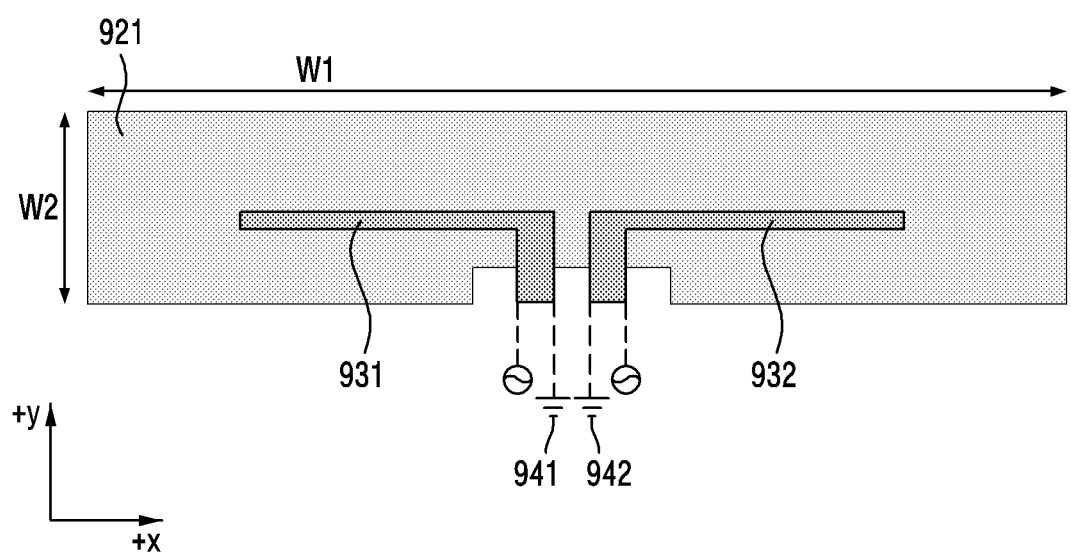
FIG. 9E is a view illustrating a first conductive member and a second conductive member according to an embodiment.

FIG. 9E is a view illustrating a first conductive member and a second conductive member according to an embodiment.

Referring to FIG. 9E, the first conductive member 931 and the second conductive member 932 according to an embodiment may be disposed in a first direction (e.g., the −z direction) perpendicular to one surface of a metal plate 921. In an embodiment, at least a portion of the metal plate 921 may overlap the first conductive member 931 and the second conductive member 932 when viewed in the first direction (e.g., the −z direction). In an embodiment, the first conductive member 931 and the second conductive member 932 may be L-shaped. In an embodiment, the first conductive member 931 and the second conductive member 32 may be spaced apart from each other by a distance that can be electromagnetically connected to the metal plate 921 via a coupling.

According to an embodiment, the wireless communication circuit 230 may feed power to the first conductive member 931 and/or the second conductive member 932 to transmit and/or receive a signal in a first frequency band (e.g., about 2.4 GHz to 2.6 GHz).

According to an embodiment, the first conductive member 931 may be electrically connected to a first ground 941 of the electronic device 101, and the second conductive member 932 may be electrically connected to a second ground 942 of the electronic device 101. In addition, the metal plate 921 may be electromagnetically connected to the first conductive member 931 and the second conductive member 932 via a coupling. As a result, the metal plate 921 may be electrically connected to the first ground 941 and/or the second ground 942 via a coupling. In an embodiment, the electronic device 101 may secure the isolation of antennas by allowing the metal plate 921 to be electrically connected to the first ground 941 and/or the second ground 942 via a coupling.

For example, when the metal plate 921 is not electrically connected to the first ground 941 and the second ground 942 via the coupling, mutual interference may be caused between electrical paths formed in the metal plate 921 as the wireless communication circuit 230 feeds power to the first conductive member 931 and the second conductive member 932. In contrast, when the metal plate 921 according to an embodiment is electrically connected to the first ground 941 and the second ground 942, the first electrical path formed as the wireless communication circuit 230 feeds power to the first conductive member 931 may be grounded to the first ground 941, and the second electrical path formed as the wireless communication circuit 230 feeds power to the second conductive member 932 may be grounded to the second ground 942. Accordingly, in the electronic device 101, it is possible to prevent interference that may occur when power is fed to the first conductive member 931 and the second conductive member 932, and to secure the isolation of antennas.

In an embodiment, in the electronic device 101, it is possible to enhance of the usability of the internal space of the electronic device 101 by allowing the metal plate 921 to be electrically connected to the first ground 941 and/or the second ground 942 via a coupling.

For example, when the metal plate 921 is not electrically connected to the first ground 941 and/or the second ground 942, it is necessary for the first conductive member 931 and the second conductive members 932 to be spaced apart from each other by about 1.5 times a wavelength corresponding to a specific frequency band. In contrast, when the metal plate 921 according to an embodiment is electrically connected to the first ground 941 and the second ground 942, the isolation of antennas is secured. Thus, it is not necessary to dispose the first conductive member 931 and the second conductive member 932 to be spaced apart from each other by 1.5 times the wavelength. As a result, in the electronic device 101, it is possible to enhance of the usability of the limited internal space of the electronic device 101. As used herein, the term "specific frequency band" may refer to a frequency band in which the wireless communication circuit 230 transmits and/or receives by using the first conductive member 931 and the second conductive member 932.

Figure 9F:
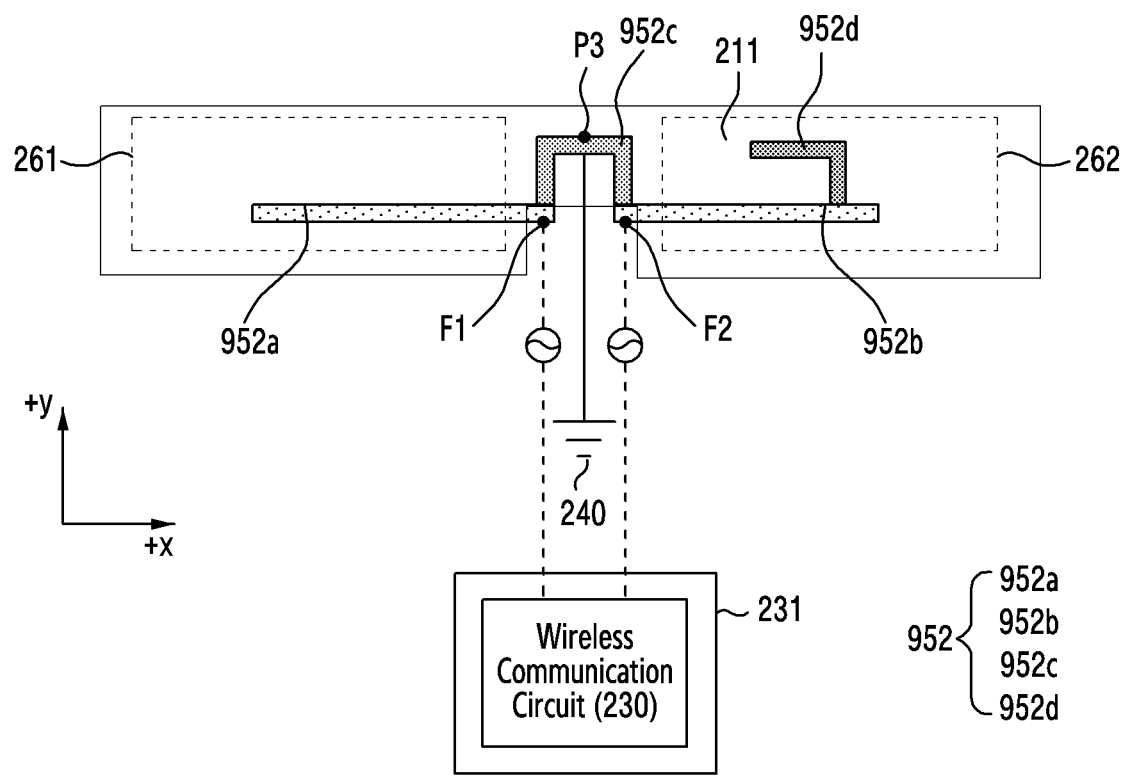
FIG. 9F is a view illustrating the use of a conductive member and a metal plate as an antenna radiator according to an embodiment.

FIG. 9F is a view illustrating the use of a conductive member and a metal plate as an antenna radiator according to an embodiment.

Referring to FIG. 9F, according to an embodiment, the electronic device 101 may include a conductive member 952. The conductive member 952 may include a first portion 952a elongated in a first direction (e.g., the x-axis direction), a second portion 952b elongated in the first direction (e.g., the x-axis direction), a third portion third portion 952c that connects the first portion 952a and the second portion 952b, and a fourth portion 952d. The fourth portion 952d may correspond to a portion extending from a point of the second portion 952b.

The shape of the conductive member 952 illustrated in FIG. 9F may correspond to a shape that further includes the fourth portion 952d compared to the conductive member 212 illustrated in FIGS. 2A to 2C.

According to an embodiment, the wireless communication circuit 230 may transmit and/or receive a signal in a first frequency band by feeding power to the first feeding point F1 of the conductive member 952.

In an embodiment, the wireless communication circuit 230 may transmit and/or receive signals in a first frequency band and/or a second frequency band by feeding power to the second feeding point F2 of the conductive member 952. For example, the wireless communication circuit 230 may transmit and/or receive a signal in the first frequency band based on the first electrical path including the second portion 952b of the conductive member 952 and the second region 262 of the metal plate 211. As another example, the wireless communication circuit 230 may transmit and/or receive a signal in the second frequency band based on the second electrical path including the second portion 952b and the fourth portion 952d of the conductive member 952, and the second region 262 of the metal plate 211. For example, as used herein, the term "second frequency band" may refer to a relatively lower frequency band than the first frequency band.

As a result, the electronic device 101 may secure multi-resonance by using the fourth portion 952d of the conductive member 952, and may transmit and/or receive signals of multiple frequency bands.

According to an embodiment, even when the wireless communication circuit 230 transmits and/or receives a signal in the second frequency band by using the fourth portion 952d of the conductive member 952, it is possible to secure the isolation of antennas based on the principle described above with reference to FIG. 4. The principle describe above with reference to FIG. 4 may mean that a low-pass filter and a high-pass filter are formed by the structures of the metal plate 211 and the conductive member 952 adjacent to the metal plate 211 so that a cutoff frequency band (e.g., the second frequency band) is formed.

Figure 9G:
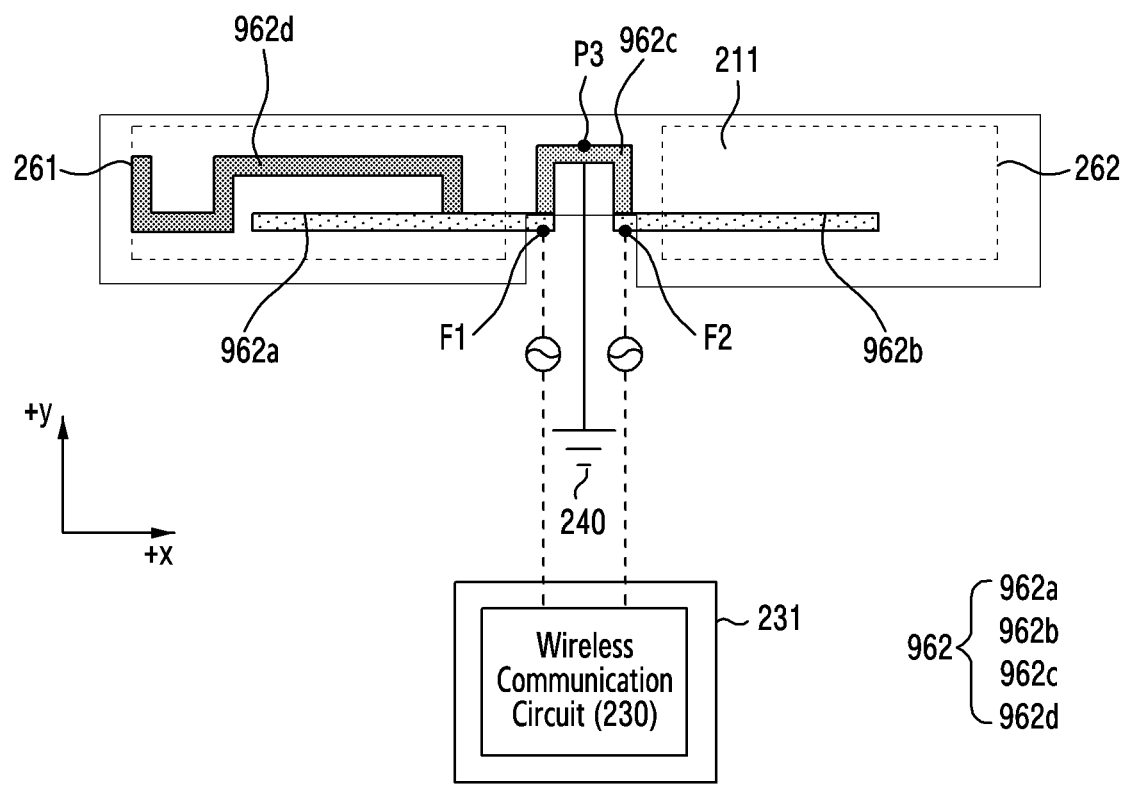
FIG. 9G is a view illustrating the use of a conductive member and a metal plate as an antenna radiator according to an embodiment.

FIG. 9G is a view illustrating the use of a conductive member and a metal plate as an antenna radiator according to an embodiment.

Referring to FIG. 9G, an electronic device 101 according to an embodiment may include a conductive member 962. The conductive member 962 may include a first portion 962a elongated in a first direction (e.g., the x-axis direction), a second portion 962b elongated in the first direction (e.g., the x-axis direction), a third portion 962c that connects the first portion 962a and the second portion 962b, and a fourth portion 962d. The fourth portion 962d may correspond to a portion extending from a point of the first portion 962a.

The shape of the conductive member 962 illustrated in FIG. 9G may correspond to a shape that further includes the fourth portion 962d compared to the conductive member 212 illustrated in FIGS. 2A to 2C.

According to an embodiment, the wireless communication circuit 230 may transmit and/or receive a signal in a first frequency band by feeding power to the second feeding point F2 of the conductive member 962.

In an embodiment, the wireless communication circuit 230 may transmit and/or receive signals in a first frequency band and/or a second frequency band by feeding power to the first feeding point F1 of the conductive member 962. For example, the wireless communication circuit 230 may transmit and/or receive a signal in the first frequency band based on the first electrical path including the first portion 962a of the conductive member 962 and the first region 261 of the metal plate 211. As another example, the wireless communication circuit 230 may transmit and/or receive a signal in the second band based on the second electrical path including the first portion 962a and the fourth portion 962d of the conductive member 962, and the first region 261 of the metal plate 211. For example, as used herein, the term "second frequency band" may refer to a relatively lower frequency band than the first frequency band.

As a result, the electronic device 101 may secure multi-resonance by using the fourth portion 962d of the conductive member 962, and may transmit and/or receive signals of multiple frequency bands.

Figure 10A:
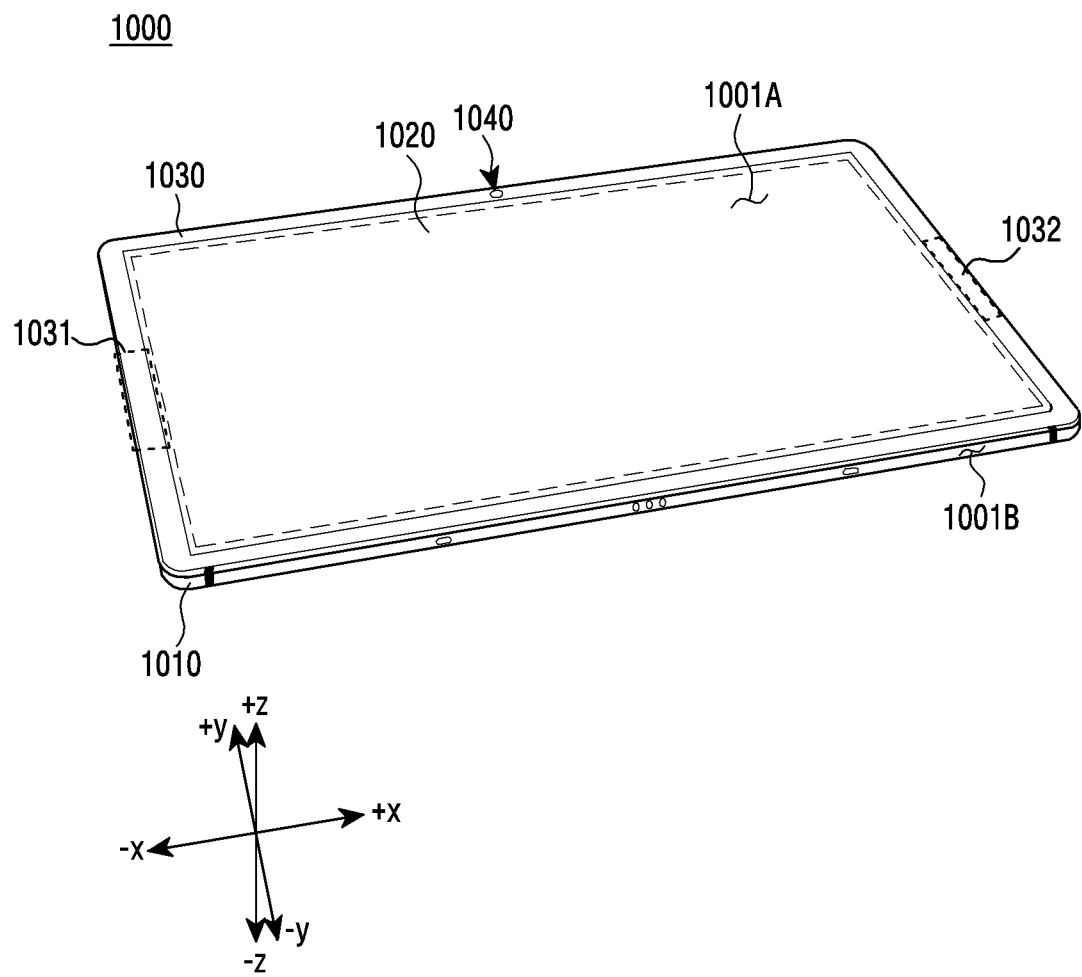
FIG. 10A is a perspective view illustrating positions at which a metal plate and a conductive member are disposed in an electronic device according to an embodiment.

FIG. 10A is a view illustrating positions at which a metal plate and a conductive member are disposed in an electronic device according to an embodiment.

Referring to FIG. 10A, an electronic device 1000 according to an embodiment may include a first surface (or a "front surface") 1001A and a second surface (or a "side surface") 1001B. The electronic device 1000 may include a frame structure 1010 that forms at least a portion of the side surface. In an embodiment, at least a portion the first surface 1001A may be formed by a window 1030 (e.g., a glass plate or a polymer plate including various coating layers) at least a portion of which is substantially transparent. In an embodiment, the frame structure 1010 may be coupled to the window 1030 that forms the first surface 1001A. The frame structure 1010 may include, for example, a conductive material (e.g., aluminum, stainless steel (STS), or magnesium) and/or a non-conductive material (e.g., a polymer). In an embodiment, the electronic device 1000 may include a display 1020 and/or a camera module 1040.

According to an embodiment, the metal plate 211 and the conductive member 212 may be disposed under the window 1030 (e.g., in the −z direction). For example, the metal plate 211 and the conductive member 212 may be disposed under the first portion 1031 of the window 1030 (e.g., in the −z direction) to be oriented in the first direction (e.g., the +z direction). As another example, the metal plate 211 and the conductive member 212 may be disposed under the second portion 1032 of the window 1030 (e.g., in the −z direction). In an example, the electronic device 1000 may include a support member for fixing the metal plate 211 and the conductive member 212, wherein the metal plate 211 and the conductive member 212 may be disposed under the first portion 1031 (e.g., in the −z direction) or under the second portion 1032 (e.g., in the −z direction) of the window 103 by the support member.

However, the portions (e.g., the first portion 1031 and the second portion 1032) under the window 1030 (e.g., in the −z direction) in which the metal plate 211 and the conductive member 212 illustrated in FIG. 10A are disposed are merely an example, and in an embodiment, the metal plate 211 and the conductive member 212 may be disposed at various positions under the window 1030 (e.g., in the −z direction).

Although FIG. 10A illustrates an embodiment in which the electronic device 1000 is a tablet electronic device, the electronic device 1000 is not limited to the above-described embodiment. According to an embodiment, the electronic device 1000 may be a foldable electronic device capable of switching between a folded state and a flat state (or an "unfolded state"). According to an embodiment, the electronic device 1000 may be a rollable or slidable electronic device capable of switching between an open state and a closed state. Hereinafter, various embodiments of the disclosure will be described with reference to a tablet electronic device, but various embodiments of the disclosure may be applied to a rollable electronic device or a slidable electronic device. Hereinafter, an embodiment in which a metal plate 211 and a conductive member 212 are disposed in a bar type electronic device as an embodiment will be described with reference to FIG. 11.

Figure 10B:
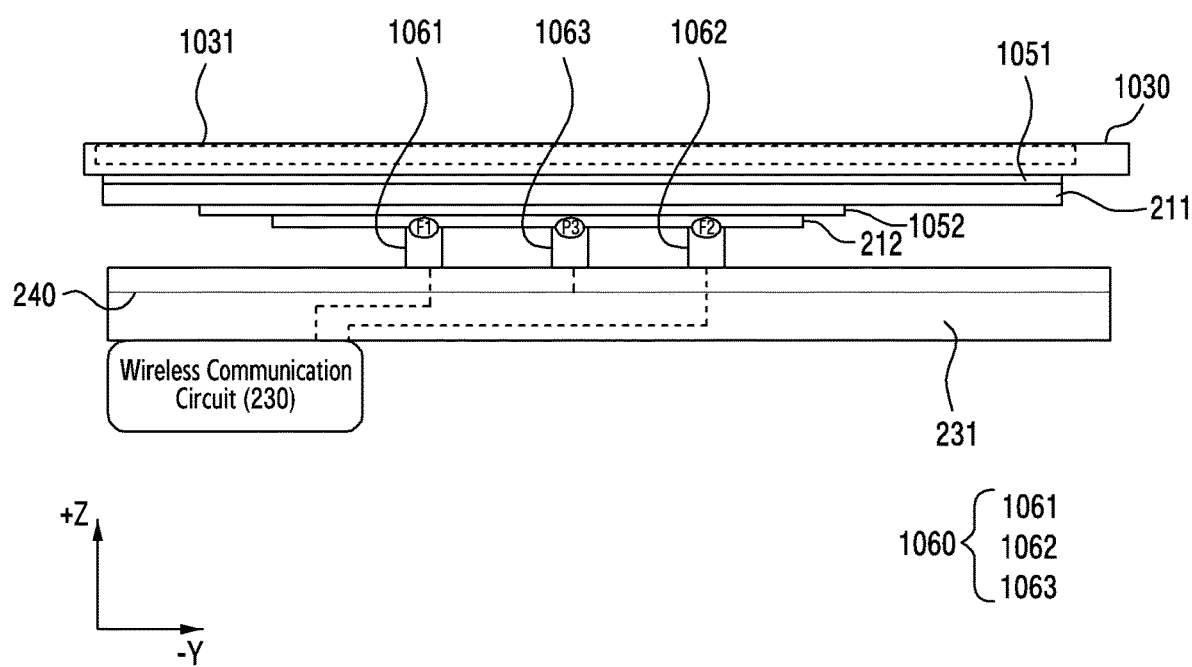
FIG. 10B is a view illustrating the structures of the metal plate and the conductive member disposed under a first portion of a window according to an embodiment.

FIG. 10B is a view illustrating the structures of the metal plate and the conductive member disposed under a first portion of a window according to an embodiment.

Referring to FIG. 10B, the metal plate 211 may be disposed under the first portion 1031 of the window 1030 according to an embodiment (e.g., in the −z direction), and the metal plate 211 may be bonded (or coupled) to the window 1030 via a first adhesive member 1051. The conductive member 212 may be disposed under the metal plate 211 (e.g., in the −z direction), and the conductive member 212 may be bonded to the metal plate 211 via a second adhesive member 1052. As a result, the conductive member 212 may be spaced apart from the metal plate 211 by a specific distance. For example, the second adhesive member 1052 may be formed of a dielectric material.

According to an embodiment, the wireless communication circuit 230 may be disposed on one surface of a printed circuit board 231, and may be electrically connected to the conductive member 212 via conductive connection members 1060. For example, the wireless communication circuit 230 may be electrically connected to a first feeding point F1 of the conductive member 212 via a first conductive connection member 1061. As another example, the wireless communication circuit 230 may be electrically connected to a second feeding point F2 of the conductive member 212 via a second conductive connection member 1062. According to an embodiment, the conductive member 212 may be electrically connected to a ground 240 of the printed circuit board 231 via a third conductive connection member 1063 at a third point P3. In an embodiment, the conductive connection members 1060 may correspond to, for example, a C-clip, a pogo-pin, and/or a coaxial cable.

With reference FIG. 10B, it has been described that the metal plate 211 and the conductive member 212 are disposed under the first portion 1031 of the window 1030 for convenience of description, but this is only an example. As described above with reference to FIG. 10A, the metal plate 211 and the conductive member 212 may be disposed at various positions under the window 1030 (e.g., in the −z direction). For example, the metal plate 211 and the conductive member 212 may be disposed under a second portion 1032 of the window 1030. As another example, the metal plate 211 and the conductive member 212 may be disposed under the window 1030 other than the first portion 1031 and the second portion 1032.

Figure 10C:
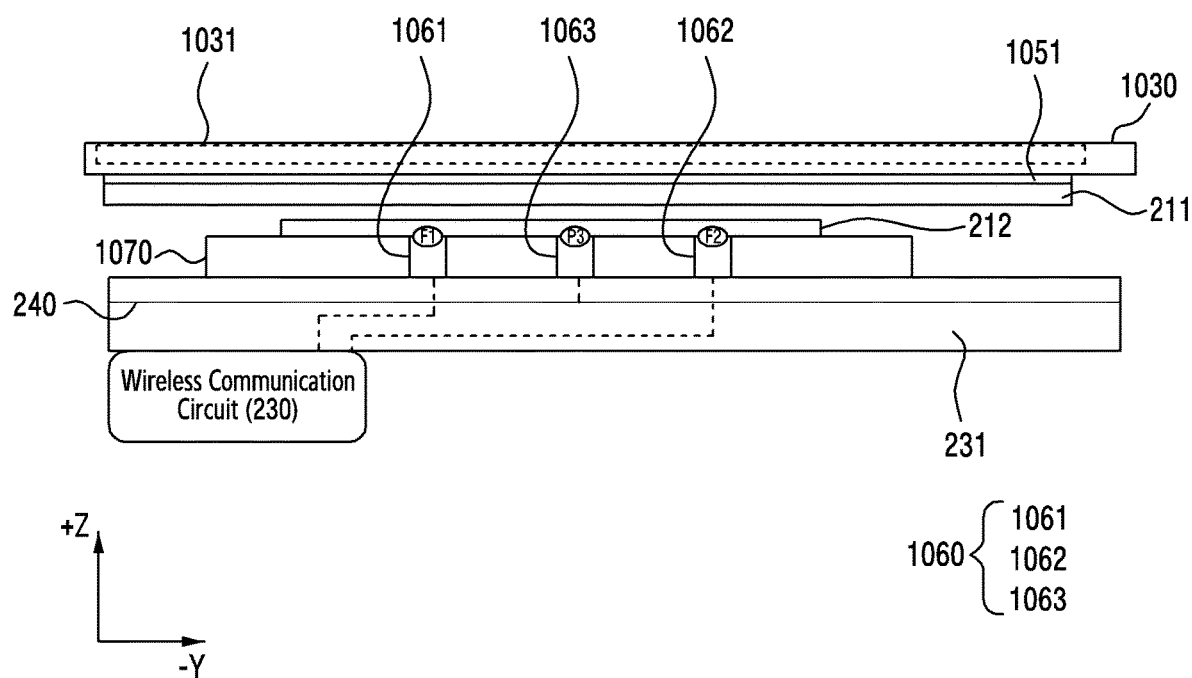
FIG. 10C is a view illustrating the structures of the metal plate and the conductive member disposed under a first portion of a window according to an embodiment.

FIG. 10C is a view illustrating the structures of the metal plate and the conductive member disposed under a first portion of a window according to an embodiment.

Referring to FIG. 10C, the metal plate 211 may be disposed under the first portion 1031 of the window 1030 according to an embodiment (e.g., in the −z direction), and the metal plate 211 may be bonded (or coupled) to the window 1030 via a first adhesive member 1051. The conductive member 212 may be disposed under the metal plate 211 (e.g., in the −z direction), wherein the conductive member 212 may be spaced apart from the metal plate 211 by a specific distance. In an embodiment, the conductive member 212 may be fixed by a support member 1070. For example, the support member 1070 may be disposed on the printed circuit board 231, and the conductive member 212 may be disposed and fixed above the support member 1070 (e.g., in the +z direction).

According to an embodiment, each of the conductive connection members 1060 may be positioned at a point on the printed circuit board 231, and may penetrate the support member 1070 to be electrically connected to the conductive member 212.

According to an embodiment, the wireless communication circuit 230 may be disposed on one surface of the printed circuit board 231, and may be electrically connected to the conductive member 212 via conductive connection members 1060. For example, the wireless communication circuit 230 may be electrically connected to a first feeding point F1 of the conductive member 212 via a first conductive connection member 1061. As another example, the wireless communication circuit 230 may be electrically connected to a second feeding point F2 of the conductive member 212 via a second conductive connection member 1062. According to an embodiment, the conductive member 212 may be electrically connected to a ground 240 of the printed circuit board 231 via a third conductive connection member 1063 at a third point P3. In an embodiment, the conductive connection members 1060 may correspond to, for example, a C-clip, a pogo-pin, and/or a coaxial cable.

With reference FIG. 10C, it has been described that the metal plate 211 and the conductive member 212 are disposed under the first portion 1031 of the window 1030 for convenience of description, but this is only an example. As described above with reference to FIG. 10A, the metal plate 211 and the conductive member 212 may be disposed at various positions under the window 1030 (e.g., in the −z direction). For example, the metal plate 211 and the conductive member 212 may be disposed under a second portion 1032 of the window 1030. As another example, the metal plate 211 and the conductive member 212 may be disposed under the window 1030 other than the first portion 1031 and the second portion 1032.

Figure 11:
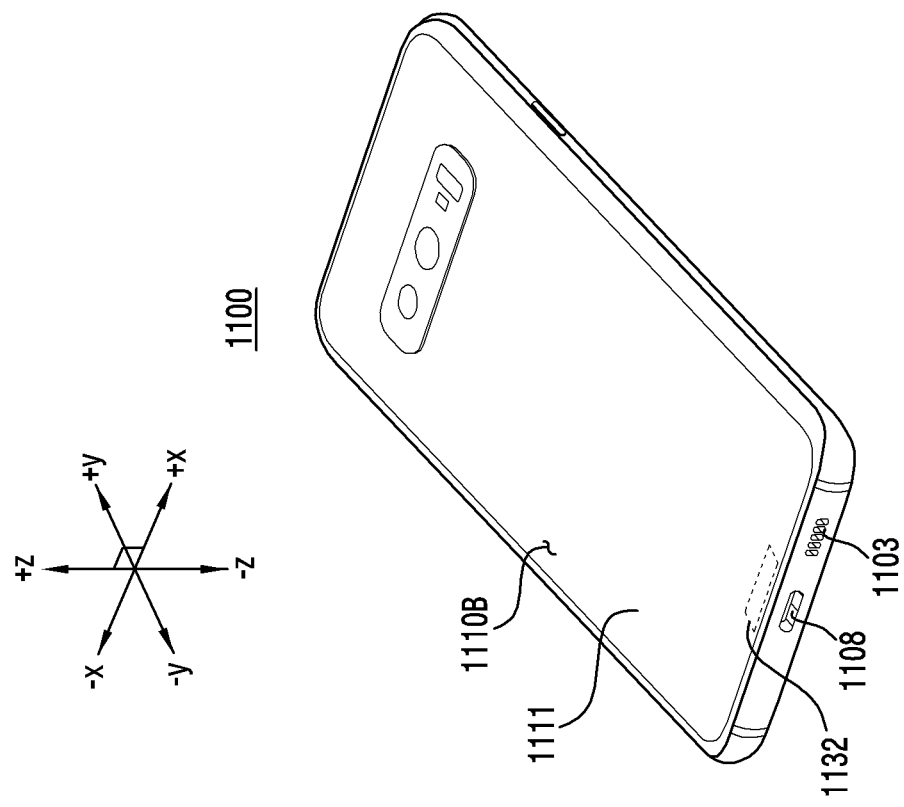
FIG. 11 are perspective views illustrating the front and rear surfaces of an electronic device according to an embodiment.
Figure 11:
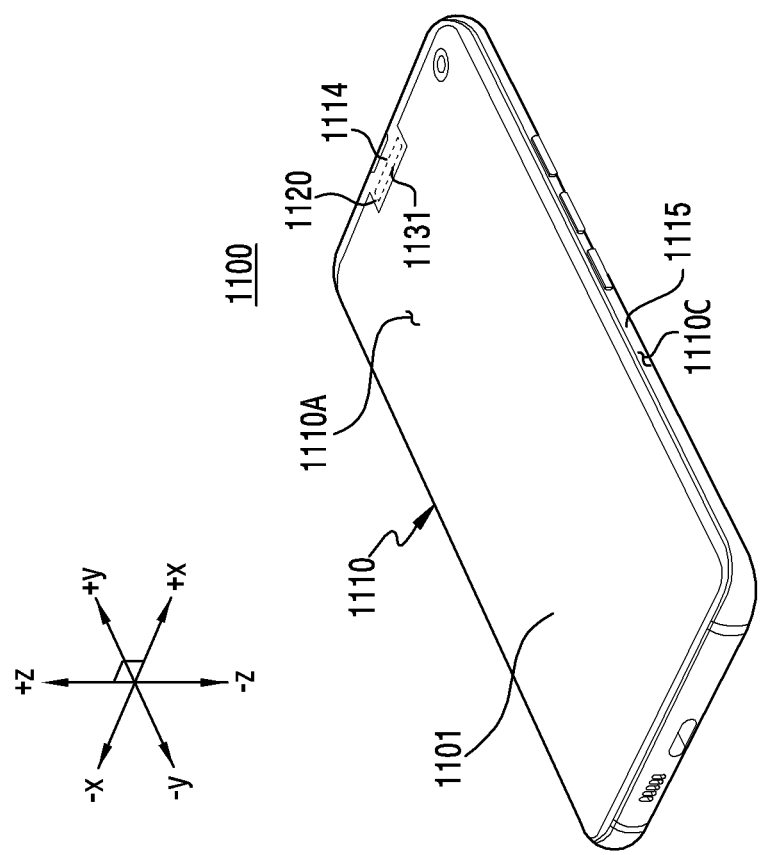

FIG. 11 is a view illustrating the front and rear surfaces of an electronic device according to an embodiment.

Referring to FIG. 11, an electronic device 1100 according to an embodiment may include a housing 1110 including a first surface (or a front surface) 1110A, a second surface (or a rear surface) 1110B, and a side surface 1110C (or a side wall) surrounding the space between the first surface 1110A and the second surface 1110B. According to an embodiment, at least a portion of the first surface 1110A of the electronic device 1100 may be formed by a substantially transparent front plate 1102 (e.g., a glass plate or a polymer plate including various coating layers). According to an embodiment, the front plate 1102 may include a curved portion bent and seamlessly extending from the first surface 1110A toward a rear cover 1111 in at least one side edge portion. According to an embodiment, the second surface 1110B may be formed by the rear cover 1111 which is substantially opaque. The rear cover 1111 may be made of, for example, coated or colored glass, ceramic, polymer, metal (e.g., aluminum, stainless steel (STS), or magnesium), or a combination of two or more of these materials. According to an embodiment, the rear cover 1111 may include a curved portion bent and extending seamlessly from the second surface 1110B toward the front plate 1102 in at least one side edge portion. According to an embodiment, the side surface 1110C of the electronic device 1100 may be coupled to the front plate 1102 and the rear cover 1111, and may be configured with a frame 1115 including a metal and/or a polymer. In an embodiment, the rear cover 1111 and the frame 1115 may be configured integrally and may include substantially the same material (e.g., a metal material such as aluminum).

According to an embodiment, the electronic device 1100 may include a display 1101 and a window 1120 that forms the front surface of the electronic device 1100. In an embodiment, the window 1120 may be provided to extend from the front plate 1102. For example, the window 1120 may be provided to extend from the front plate 1102 in the first direction (e.g., the −y direction). In an embodiment, the window 1120 may be formed of a non-conductive material (e.g., a polymer).

According to an embodiment, the metal plate 211 and the conductive member 212 may be located under the window 1120 (e.g., in the −z direction). For example, the metal plate 211 and the conductive member 212 may be disposed in a first portion 1131 located under the window 1120 (e.g., in the −z direction).

However, the positions at which the metal plate 211 and the conductive member 212 are disposed in the electronic device 1100 are not limited to the first portion 1131 and may be disposed at various positions. For example, the metal plate 211 and the conductive member 212 may be disposed in a second portion 1132 located in a third direction (e.g., +z direction) of the rear cover 1111.

An electronic device 101 according to various embodiments disclosed herein may include: an antenna radiator (e.g., the metal plate 211); a conductive member 212 disposed to be spaced apart from the antenna radiator (e.g., the metal plate 211) by a specific distance in a first direction perpendicular to one surface of the antenna radiator (e.g., the metal plate 211), wherein the conductive member 212 is electrically connected to the antenna radiator (e.g., the metal plate 211) via a coupling; a wireless communication circuit 230 configured to feed power to a first point of the conductive member 212 and a second point spaced apart from the first point; and a ground 240 electrically connected to a third point between the first point and the second point of the conductive member 212, wherein at least a portion of a coupling region 250 of the conductive member 212 that includes the third point may overlap the antenna radiator (e.g., the metal plate 211) when viewed in the first direction, and wherein the wireless communication circuit 230 may be configured to: transmit and/or receive a signal of a first frequency band based on a first electrical path E1 formed in a first portion 212a of the conductive member 212 including the first point and a first region 261 of the antenna radiator (e.g., the metal plate 211) corresponding to the first portion 212 by feeding power to the first point of the conductive member 212; and transmit and/or receive a signal of the first frequency band or a second frequency band based on a second electrical path E2 formed in a second portion 212b of the conductive member 212 including the second point and a second region 262 of the antenna radiator (e.g., the metal plate 211) corresponding to the second portion 212b by feeding power to the second point of the conductive member 212.

According to an embodiment, the conductive member 212 may include a third portion 212c that connects the first portion 212a and the second portion 212b, and the third portion 212c may have a rectangular shape.

According to an embodiment, the first portion 212a and the second portion 212b of the conductive member 212 may have a length of ¼ of a wavelength corresponding to the first frequency band.

According to an embodiment, a first length from the center of the antenna radiator (e.g., the metal plate 211) to a first end of the antenna radiator (e.g., the metal plate 211) may be longer than a second length from a center of the conductive member 212 to a second end of the conductive member 212.

According to an embodiment, the antenna radiator (e.g., the metal plate 211) may include a recess having a specific size.

According to an embodiment, the specific distance may be 2 mm to 4 mm.

According to an embodiment, the electronic device may further include a printed circuit board 231 on which the wireless communication circuit 230 is disposed.

According to an embodiment, the printed circuit board 231 may include a plurality of conductive layers, and the ground 240 may be provided in a first layer among the plurality of conductive layers of the printed circuit board 231.

According to an embodiment, at least a portion of the first portion 212a of the conductive member 212 may overlap the antenna radiator (e.g., the metal plate 211) when viewed in the first direction, and at least a portion of the second portion 212b of the conductive member 212 may overlap the antenna radiator (e.g., the metal plate 211) when viewed in the first direction.

The electronic device 1000 according to an embodiment may include a display 1020 disposed on the front surface of the electronic device 1000 and a window 1030 that forms the front surface of the electronic device 1000 together with the display 1020, and the antenna radiator (e.g., the metal plate 211) may be located under the window 1030.

The electronic device 1100 according to an embodiment may further include a frame 1115 that forms at least a portion of the side surface of the electronic device 1100 and a rear cover 1111 that forms at least a portion of the rear surface of the electronic device 1100, wherein the antenna radiator (e.g., the metal plate 211) may be disposed in the internal space of the electronic device 1100 to face the rear cover 1111.

According to an embodiment, the first frequency band may include 2.4 GHz to 2.6 GHz.

According to an embodiment, an area of the one region of the conductive member 212 that overlaps the antenna radiator (e.g., the metal plate 211) when viewed in the first direction may correspond to a resonance frequency of the first frequency band.

The electronic device 1000 according to an embodiment may further include a support member 1070 that may fix the conductive member 212 to be located in the first direction with respect to the antenna radiator (e.g., the metal plate 211).

According to an embodiment, the conductive member 212 may include a third portion 212c that connects the first portion 212a and the second portion 212b, and the third portion 212c may be U-shaped or hairpin-shaped.

An electronic device 101 according to various embodiments disclosed herein may include: a metal plate 211 configured to act as an antenna radiator; a conductive member 212 disposed to be spaced apart from the metal plate 211 by a specific distance in a first direction perpendicular to one surface of the metal plate 211, wherein the conductive member 212 is electrically connected to the metal plate 211 via a coupling; a wireless communication circuit 230 configured to feed power to a first point of the conductive member 212 and a second point spaced apart from the first point; and a ground 240 electrically connected to a third point between the first point and the second point of the conductive member 212, wherein at least a portion of a coupling region 250 of the conductive member 212 that includes the third point may overlap the metal plate 211 when viewed in the first direction, and wherein the wireless communication circuit 230 may be configured to: transmit and/or receive a signal of a first frequency band based on a first electrical path E1 formed in a first portion 212a of the conductive member 212 including the first point and a first region 261 of the metal plate 211 corresponding to the first portion 212a by feeding power to the first point of the conductive member 212; and transmit and/or receive a signal of the first frequency band or a second frequency band based on a second electrical path E2 formed in a second portion 212b of the conductive member 212 including the second point and a second region 262 of the metal plate 211 corresponding to the second portion 212b by feeding power to the second point of the conductive member 212.

According to an embodiment, the conductive member 212 may include a third portion 212c that connects the first portion 212a and the second portion 212b, and the third portion 212c of the second conductive member 212 may have a rectangular shape.

According to an embodiment, the first portion 212a and the second portion 212b of the conductive member 212 may have a length of ¼ of a wavelength corresponding to the first frequency band.

According to an embodiment, an area of the one region of the conductive member 212 may correspond to a resonance frequency of the first frequency band.

The electronic device 1000 according to an embodiment may include a display 1020 disposed on the front surface of the electronic device 1000 and a window 1030 that forms the front surface of the electronic device 1000 together with the display 1020, and the metal plate 211 may be located under the window 1030.

What is claimed is:

1. An electronic device comprising:
   an antenna radiator;
   a conductive member spaced apart from the antenna radiator in a first direction perpendicular to one surface of the antenna radiator, wherein the conductive member is electrically connected to the antenna radiator via a coupling;
   a wireless communication circuit configured to feed power to a first point of the conductive member and a second point spaced apart from the first point; and
   a ground electrically connected to a third point between the first point and the second point of the conductive member,
   wherein at least a portion of one region of the conductive member that includes the third point overlaps the antenna radiator when viewed in the first direction, and
   wherein the wireless communication circuit is configured to:
      transmit and/or receive a signal of a first frequency band based on a first electrical path formed in a first portion of the conductive member including the first point and a first region of the antenna radiator corresponding to the first portion by feeding power to the first point of the conductive member; and
      transmit and/or receive a signal of the first frequency band or a second frequency band based on a second electrical path formed in a second portion of the conductive member including the second point and a second region of the antenna radiator corresponding to the second portion by feeding power to the second point of the conductive member.

2. The electronic device of claim 1, wherein the conductive member includes a third portion that connects the first portion and the second portion, and
   wherein the third portion of the conductive member has a rectangular shape.

3. The electronic device of claim 2, wherein the first portion and the second portion of the conductive member each have a length of ¼ of a wavelength corresponding to the first frequency band.

4. The electronic device of claim 1, wherein a first length from a center of the antenna radiator to a first end of the antenna radiator is longer than a second length from a center of the conductive member to a second end of the conductive member.

5. The electronic device of claim 1, wherein the antenna radiator includes a recess of a specific size.

6. The electronic device of claim 1, wherein the specific distance is 2 mm to 4 mm.

7. The electronic device of claim 1, further comprising:
   a printed circuit board on which the wireless communication circuit is disposed.

8. The electronic device of claim 7, wherein the printed circuit board includes a plurality of conductive layers, and
   wherein the ground is provided in a first layer among the plurality of conductive layers of the printed circuit board.

9. The electronic device of claim 1, wherein at least a portion of the first portion of the conductive member overlaps the antenna radiator when viewed in the first direction, and
   wherein at least a portion of the second portion of the conductive member overlaps the antenna radiator when viewed in the first direction.

10. The electronic device of claim 1, further comprising:
    a display disposed on a front surface of the electronic device; and
    a window forming the front surface of the electronic device together with the display,
    wherein the antenna radiator is located under the window.

11. The electronic device of claim 1, further comprising:
    a frame structure forming at least a portion of a side surface of the electronic device; and
    a rear cover forming at least a portion of a rear surface of the electronic device,
    wherein the antenna radiator is disposed in an internal space of the electronic device to face the rear cover.

12. The electronic device of claim 1, wherein the first frequency band includes 2.4 GHz to 2.6 GHz.

13. The electronic device of claim 1, wherein an area of the one region of the conductive member overlapping the antenna radiator when viewed in the first direction corresponds to a resonance frequency of the first frequency band.

14. The electronic device of claim 1, further comprising:
    a support member that fixes the conductive member to be located in the first direction with respect to the antenna radiator.

15. The electronic device of claim 1, wherein the conductive member includes a third portion that connects the first portion and the second portion, and
    wherein the third portion has a U-shape.

16. An electronic device comprising:
    a metal plate configured to act as an antenna radiator;
    a conductive member spaced apart from the metal plate in a first direction perpendicular to one surface of the metal plate, wherein the conductive member is electrically connected to the metal plate via a coupling;
    a wireless communication circuit configured to feed power to a first point of the conductive member and a second point spaced apart from the first point; and
    a ground electrically connected to a third point between the first point and the second point of the conductive member,
    wherein at least a portion of one region of the conductive member that includes the third point overlaps the metal plate when viewed in the first direction, and
    wherein the wireless communication circuit is configured to:
       transmit and/or receive a signal of a first frequency band based on a first electrical path formed in a first portion of the conductive member including the first point and a first region of the metal plate corresponding to the first portion by feeding power to the first point of the conductive member; and
       transmit and/or receive a signal of the first frequency band or a second frequency band based on a second electrical path formed in a second portion of the conductive member including the second point and a second region of the metal plate corresponding to the second portion by feeding power to the second point of the conductive member.

17. The electronic device of claim 16, wherein the conductive member includes a third portion that connects the first portion and the second portion, and wherein the third portion of the conductive member has a rectangular shape.

18. The electronic device of claim 17, wherein the first portion and the second portion of the conductive member each have a length of ¼ of a wavelength corresponding to the first frequency band.

19. The electronic device of claim 16, wherein an area of the one region of the conductive member corresponds to a resonance frequency of the first frequency band.

20. The electronic device of claim 16, further comprising:
a display disposed on a front surface of the electronic device; and
a window that forms the front surface of the electronic device together with the display,
wherein the metal plate is located under the window.

* * * * *